United States Patent

Seelig

(10) Patent No.: US 9,754,265 B2
(45) Date of Patent: Sep. 5, 2017

(54) SYSTEMS AND METHODS TO AUTOMATICALLY ACTIVATE DISTRIBUTION CHANNELS PROVIDED BY BUSINESS PARTNERS

(75) Inventor: Michael J. Seelig, Berkeley, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2373 days.

(21) Appl. No.: 11/414,821

(22) Filed: May 1, 2006

(65) Prior Publication Data

US 2007/0255604 A1 Nov. 1, 2007

(51) Int. Cl.
*G06Q 10/06* (2012.01)
*G06Q 30/02* (2012.01)

(52) U.S. Cl.
CPC ......... *G06Q 30/02* (2013.01); *G06Q 10/0639* (2013.01); *G06Q 10/06316* (2013.01)

(58) Field of Classification Search
CPC .............................................. G06Q 10/06316
See application file for complete search history.

(56) References Cited

U.S. PATENT DOCUMENTS

| 6,009,525 | A * | 12/1999 | Horstmann | ............. G06F 21/10 705/54 |
| 6,279,026 | B1 | 8/2001 | Clarke et al. | |
| 6,446,225 | B1 | 9/2002 | Robsman et al. | |
| 6,687,859 | B2 | 2/2004 | Robsman et al. | |
| 2001/0018700 | A1 | 8/2001 | Clarke et al. | |
| 2002/0007340 | A1 | 1/2002 | Isaf et al. | |
| 2002/0082954 | A1 | 6/2002 | Dunston | |
| 2002/0122062 | A1 | 9/2002 | Melamed et al. | |
| 2002/0124042 | A1 | 9/2002 | Melamed et al. | |
| 2002/0165724 | A1 | 11/2002 | Blankesteijn | |
| 2003/0009416 | A1 | 1/2003 | Mara | |
| 2003/0014326 | A1 * | 1/2003 | Ben-Meir et al. | ............. 705/26 |
| 2003/0014483 | A1 | 1/2003 | Stevenson et al. | |
| 2003/0037294 | A1 | 2/2003 | Robsman et al. | |

(Continued)

OTHER PUBLICATIONS

Rozenblit, Moshe, "Secure Software Distribution," Feb. 14-17, 1994, IEEE Network Operations and Management Symposium, pp. 486-496.*

(Continued)

*Primary Examiner* — Matthew Gart
*Assistant Examiner* — Amanda Gurski
(74) *Attorney, Agent, or Firm* — Hanley, Flight & Zimmerman, LLC

(57) ABSTRACT

Systems and methods to automatically activate distribution channels to be provided by potential business partners are disclosed. An example method to enable activation of a distribution channel provided by a client company for a host company disclosed herein comprises obtaining information concerning the client company, automatically triggering at least some of a plurality of host company departments to process the information to evaluate at least one of the client company or the distribution channel, and automatically processing machine readable evaluation indicators provided by the at least some of the plurality of host company departments and representative of respective evaluation decisions associated with the at least some of the plurality of host company departments to determine an overall evaluation result.

34 Claims, 21 Drawing Sheets

(56) References Cited

U.S. PATENT DOCUMENTS

| | | |
|---|---|---|
| 2003/0135850 A1 | 7/2003 | Miloushev et al. |
| 2003/0163547 A1 | 8/2003 | Beisty et al. |
| 2003/0187743 A1 | 10/2003 | Kmaran et al. |
| 2003/0195996 A1 | 10/2003 | Jacobs et al. |
| 2003/0200255 A1 | 10/2003 | Vallone |
| 2003/0233465 A1 | 12/2003 | Le et al. |
| 2004/0064351 A1* | 4/2004 | Mikurak .................. 705/7 |
| 2004/0210500 A1 | 10/2004 | Sobel et al. |
| 2005/0010902 A1 | 1/2005 | Takacsi-Nagy et al. |
| 2005/0021689 A1 | 1/2005 | Marvin et al. |
| 2005/0022164 A1 | 1/2005 | Takacsi-Nagy et al. |
| 2005/0071841 A1 | 3/2005 | Hoflehner et al. |
| 2005/0091156 A1 | 4/2005 | Hailwood et al. |
| 2005/0108710 A1 | 5/2005 | Patiejunas |
| 2005/0125802 A1 | 6/2005 | Wang et al. |
| 2005/0149809 A1 | 7/2005 | Draeger et al. |

OTHER PUBLICATIONS

Seelig, Michael J.; Merriman, Seth G.; and Muzzafar, Bilal, U.S. Appl. No. 11/297,895, filed Dec. 7, 2005, for "Dynamic Electronic Rating and Ranking System."

Seelig, Michael J.; Merriman, Seth G.; and Muzzafar, Bilal, U.S. Appl. No. 11/297,800, filed Dec. 7, 2005, for "Web Services Development Automation Toolkit with Test Case Driver and Customized Configuration FIle."

Seelig, Michael J.; Muzzafar, Bilal; and Schmidt, Joseph F., U.S. Appl. No. 11/283,544, filed Nov. 18, 2005, for "Time-out Helper Framework."

\* cited by examiner

```
serviceLoc.setWebServicesGatewayEndpointAddress(endPointURL);//Sets the End
point url on the Service Locator.
WebServicesGateway stub=null;//Invoke Bind on the Locator
    try {
        stub=(com.api.webservices.WebServicesGatewaySoapBindingStub)
              serviceLoc.getWebServicesGateway();
    } catch(javax.xml.rpc.ServiceException jre) {
        if(jre.getLinkedCause()!=null)
              jre.getLinkedCause().printStackTrace();
        throw new APIProxyException (jre);
    } finally {
        // Set timeout
        stub.setTimeout(timeout);
    }
Return the Stub
```

SYSTEMS AND METHODS TO AUTOMATICALLY ACTIVATE DISTRIBUTION CHANNELS PROVIDED BY BUSINESS PARTNERS

FIELD OF THE DISCLOSURE

This disclosure relates generally to business distribution channels, and, more particularly, to systems and methods to automatically activate distribution channels provided by business partners.

BACKGROUND

In today's marketplace, businesses are increasingly looking to partner with other businesses to create new external distribution channels to sell, cross-sell, bundle and/or license their products and/or services. Additionally, businesses may use these external distribution channels to increase overall customer recognition. However, enabling the corresponding business partnerships requires exchanging a plethora of business and system related information between the business partners and overcoming differences in the ways each partner uses and transmits the information between companies. Furthermore, a particular business may endeavor to engage multiple business partners and each partnership may have its own unique terms, goals, and requirements.

Various partnership relationship management (PRM) concepts and applications known in the art have been developed to simplify the exchange of information and management of business partnerships. For example, a PRM application hosted by a business, i.e., a "host company," may give a partner providing an external distribution channel, i.e., a "client company," access to real-time information concerning the host company's product and/or service offerings, inventory, pricing, shipping availability, etc. Additionally, the host company's PRM application may support profiles specific to each client company that allow information to be tailored to the specific terms of the partnership agreement between the two companies. For example, the PRM application may provide tailored pricing or quantity information based on expected volume to be distributed and/or purchased or based on the priority of that client company to the host company's business objectives. The PRM application may also provide various interfacing and reporting capabilities that may be targeted to a particular client company based on the client company's requirements and/or its particular partnership agreement.

However, existing partnership relationship applications address only established distribution channels. Activating a new distribution channel to be provided by a new or existing business partner is a manually intensive process supported by numerous departments, such as, for example, marketing, finance, legal, procurement, technology, operations, etc. Businesses expend substantial numbers of person-hours acquiring information concerning the business partner and distribution channel characteristics, creating a distribution channel profile, setting up product and/or service pricing and volume specifications, specifying and designing various reports to track distribution channel sales, billing, compensation, etc. Additionally, significant numbers of person-hours are wasted in just seeking and obtaining approval from various business departments throughout the distribution channel activation process.

BRIEF DESCRIPTION OF THE DRAWINGS

FIG. 17 illustrates example source code capable of invoking a bind for use in the example application development process of FIG. 14.

DETAILED DESCRIPTION

Figure 1:
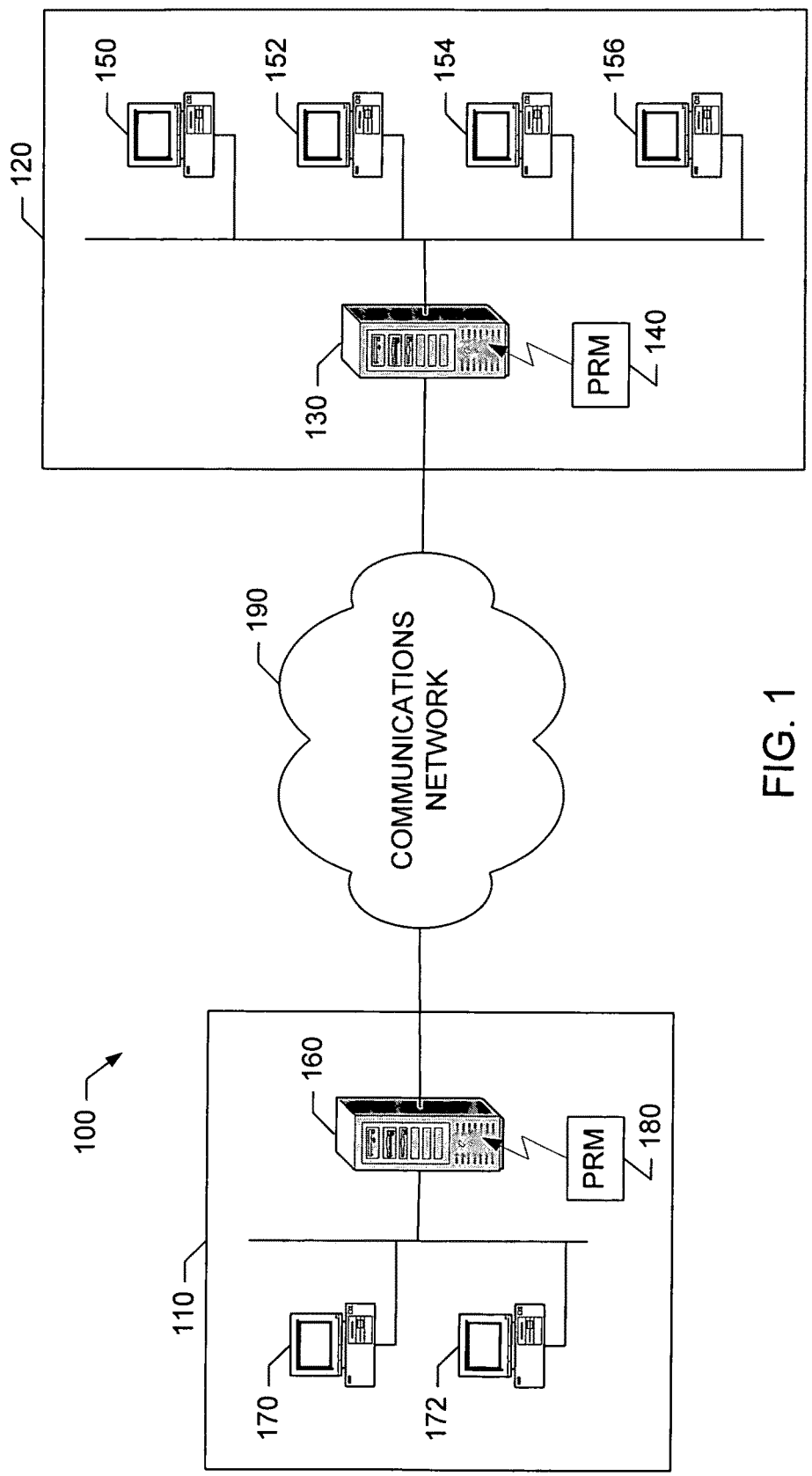
FIG. 1 is a block diagram of an example environment of use that supports automatic distribution channel activation.

An example environment of use 100 which supports the example methods disclosed herein for automatically activating a distribution channel is shown in FIG. 1. An example method to enable automatic activation of a distribution channel provided by a client company for a host company includes obtaining information concerning the client company and storing the information in a central facility accessible by a plurality of host company departments. Additionally, the example method includes automatically triggering at least some of the plurality of host company departments to process the stored information to evaluate at least one of the client company or the distribution channel. Furthermore, the example method includes automatically processing evaluation indicators provided by the at least some of the plurality of host company departments to determine an overall evaluation result.

In the example environment 100, the distribution channel is provided by a client company 110 for a host company 120. The host company 120 can be, for example, a product manufacturer, a service provider, a supplier, etc. The client company 110 can be, for example, a product distributor, a service distributor, a wholesaler, a retailer, a bulk purchaser, etc. Although for clarity only one client company 110 is shown in FIG. 1, the example environment 100 may support simultaneously and/or serially activating a plurality of distribution channels for a plurality of client companies 110. Additionally or alternatively, the example environment 100 may support activating multiple distribution channels for a single client company 110. Additionally or alternatively, the example environment 100 may support activating a single distribution channel or multiple distribution channels corresponding to multiple host companies 120.

The example host company 120 employs a central facility which includes a server 130 configured to execute a partner relationship management (PRM) application 140 or similar software application. The server 130 may be any type of computer server, such as, for example, the example computer 2000 of FIG. 20, multiple computers 2000, a special purpose computer server, custom hardware and/or software, etc. The PRM application 140 may be configured to implement, for example, any known PRM functionality, such as, but not limited to, real-time reporting of inventory, real-time reporting of service offerings, sales and compensation reporting, account management and communication, access to sales documents and training, etc. Additionally, the PRM application 140 is configured to enable automatic activation of a distribution channel provided by the client company 110 for the host company 120 as disclosed herein. Furthermore, the PRM application 140 may be configured to enable operation of the distribution channel and access to any or all of the PRM functionality described above after distribution channel activation is complete.

In the example host company 120, the server 130 is configured to interface with one or more computers 150-156 associated with one or more respective host company business departments. The computers 150-156 may be, for example, stand-alone computers 2000, computer systems containing one or more servers and/or one or more computers 2000, computers or computer terminals interfacing to department-specific software applications executing on the server 130 which are accessed based on, for example, department-specific login information, etc. The host company business departments may be one or more business departments comprising one or more individuals that form some or all of the host company 120, such as, for example, a sales department, a marketing department, an accounting department, a human resources department, an information technology department, etc. Any or all of these host company business departments may participate in launching and/or supporting a distribution channel, such as by providing distribution channel profiling, account management, resource assignments, business approval workflow, documentation collaboration, product management, promotion management, sales training, sales reporting, communications, event planning, compensation, vendor financial support, trouble ticket management, user administration, etc. Additionally or alternatively, any or all of the host company business departments may participate in the distribution channel activation process prior to launching and supporting the distribution channel, for example, by performing evaluations based on criteria specific to each host company business department.

The example client company 110 employs a computer system that may include a server 160 and one or more computers 170-172 associated with one or more respective client company business departments, one or more customer access points, and/or one or more sales locations. The server 160 may be configured to execute any appropriate computer application or applications useful to the client company 110, including, for example, its own PRM application 180.

Although FIG. 1 depicts one host company server 130 and four host company computers 150-156, the example environment 100 may include any number of servers 130 and/or computers 150-156. Similarly, although FIG. 1 depicts one client company server 160 and two client company computers 170-172, the example environment 100 may include any number of servers 160 and/or computers 170-172.

The client company 110 and the host company 120 may communicate using a communication network 190 as shown in FIG. 1. The communication network 190 may be implemented, for example, by a commonly-accessible network such as the Internet. Additionally or alternatively, the communication network 190 may be implemented by a dedicated network link, such as a point-to-point satellite network, a dedicated leased line, etc.

Figure 2:
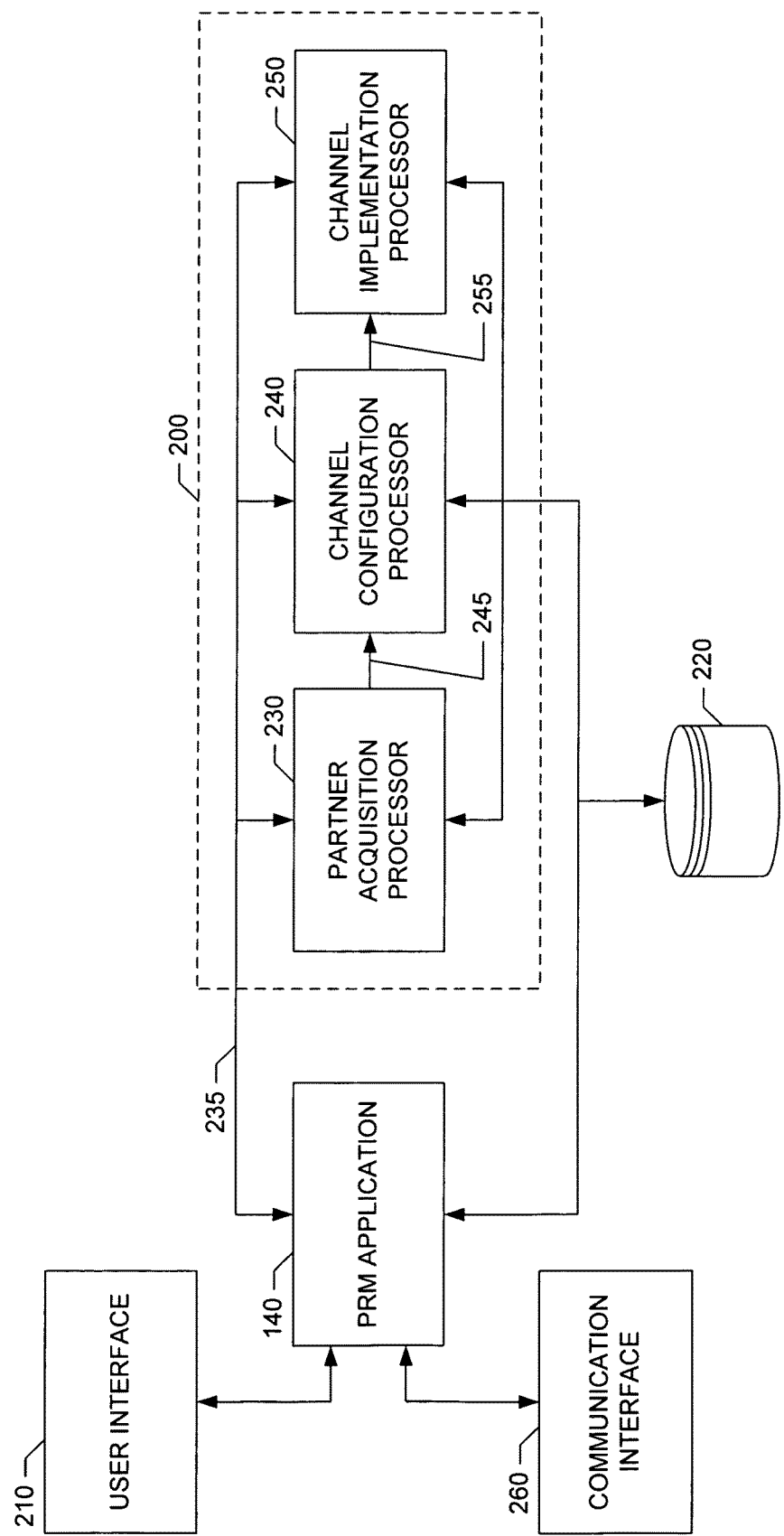
FIG. 2 is a block diagram illustrating an example PRM application and an example PRM channel activator for use in the example environment of FIG. 1.

An example PRM channel activator 200 that may be used with the PRM application 140 to activate a distribution channel is shown in FIG. 2. The PRM channel activator 200 may be implemented, for example, as a separate apparatus and/or application configured to interface with the PRM application 140, and/or as functionality implemented by the PRM application 140 and/or another application or applications executing on the server 130. As shown in FIG. 2, the PRM application 140 is configured to receive information submitted by the client company 110 via, for example, a user interface 210 and to store the received information in, for example, a database 220. The user interface 210 may be implemented, for example, as a web page or other type of interface configured to provide an electronic (e.g., online) application form, an electronic non-disclosure agreement (NDA), etc., to be completed by the client company 110.

The example PRM channel activator 200 includes a partner acquisition processor 230 configured to retrieve and/or process the client company information obtained from the database 220 and/or the PRM application 140 to enable, for example, evaluation of the characteristics of the client company 110 and/or approval of the client company 110 as a distribution channel provider. Operation of the partner acquisition processor 230 may be triggered, for example, by the PRM application 140, via the interface 235 as shown, at an appropriate time, such as to prompt the client company 110 to provide information and/or upon receipt of information from the client company 110 via the user interface 210.

Additionally, the PRM channel activator 200 includes a channel configuration processor 240 configured to retrieve and/or process the client company information obtained from the database 220 and/or the PRM application 140 to enable configuration of, for example, parameters of the distribution channel to be provided by the client company 110. Operation of the channel configuration processor 240 may be triggered, for example, by the PRM application 140, via the interface 235 as shown, and/or the partner acquisition processor 230, via the interface 245 as shown, at an appropriate time, such as upon approval of the client company 110 as a distribution channel provider.

The PRM channel activator 200 also includes a channel implementation processor 250 configured to retrieve and process the client company information obtained from the database 220 and/or the PRM application 140 to enable development, testing and verification of the functionality of the distribution channel. The channel implementation processor 250 may be configured, additionally or alternatively, to obtain approval to activate the distribution channel. Operation of the channel implementation processor 250 may be triggered, for example, by the PRM application 140, via the interface 235 as shown, and/or the channel configuration processor 240, via the interface 255 as shown, at an appropriate time, such as upon configuration of the parameters of the distribution channel to be provided by the client company 110.

At various stages during distribution channel activation, the PRM application 140 (and/or the partner acquisition processor 230, the channel configuration processor 240 and/or the channel implementation processor 250) may be configured to trigger the respective host company business departments associated with one or more of the computers 150-156 to evaluate the activation status of the distribution channel and/or to approve or disapprove the results of a present activation stage before proceeding to the next activation stage. Such triggering by the PRM application 140 may be achieved via a communication interface 260 configured, for example, to communicate with the one or more of the computers 150-156. For example, such communications may take the form of, but are not limited to, electronic messages, such as email messages, instant messages, etc. Additionally or alternatively, the communication interface 260 may also be configured to communicate with one or more persons associated with the host company business departments, for example, via communications taking the form of, but not limited to, voice messages, such as voicemail, and automated phone call, etc. The communication interface 260 may be implemented, for example, as a separate apparatus and/or application configured to interface with the PRM application 140, and/or as functionality implemented by the PRM application 140 and/or another application or applications executing on the server 130.

The PRM application 140 (and/or the partner acquisition processor 230, the channel configuration processor 240 and/or the channel implementation processor 250) may also be configured to process indicators received via the communication interface 260 from the one or more host company business departments that indicate, for example, results of status evaluations and/or approval or disapproval decisions. Additionally or alternatively, the PRM application 140 (and/or the partner acquisition processor 230, the channel configuration processor 240 and/or the channel implementation processor 250) may also be configured to communicate with the client company 110 to indicate, for example, results of the status evaluations and/or the approval or disapproval decisions, and/or to enable the client company 110 to access other PRM functionality provided by the PRM application 140. Such indications may include, but are not limited to, electronic messages, such as email messages, instant messages, etc., and/or voice messages, such as voicemail, and automated phone call, etc.

As mentioned above, the partner acquisition processor 230, the channel configuration processor 240 and/or the channel implementation processor 250 may employ the communication interface 260 to, for example, send trigger communications and/or receive indicator communications. In such an implementation, the partner acquisition processor 230, the channel configuration processor 240 and/or the channel implementation processor 250 may be configured to interface with the communication interface 260 through the PRM application 140. Additionally or alternatively, the partner acquisition processor 230, the channel configuration processor 240 and/or the channel implementation processor 250 may be configured to interface with the communication interface 260 directly.

Figure 3:
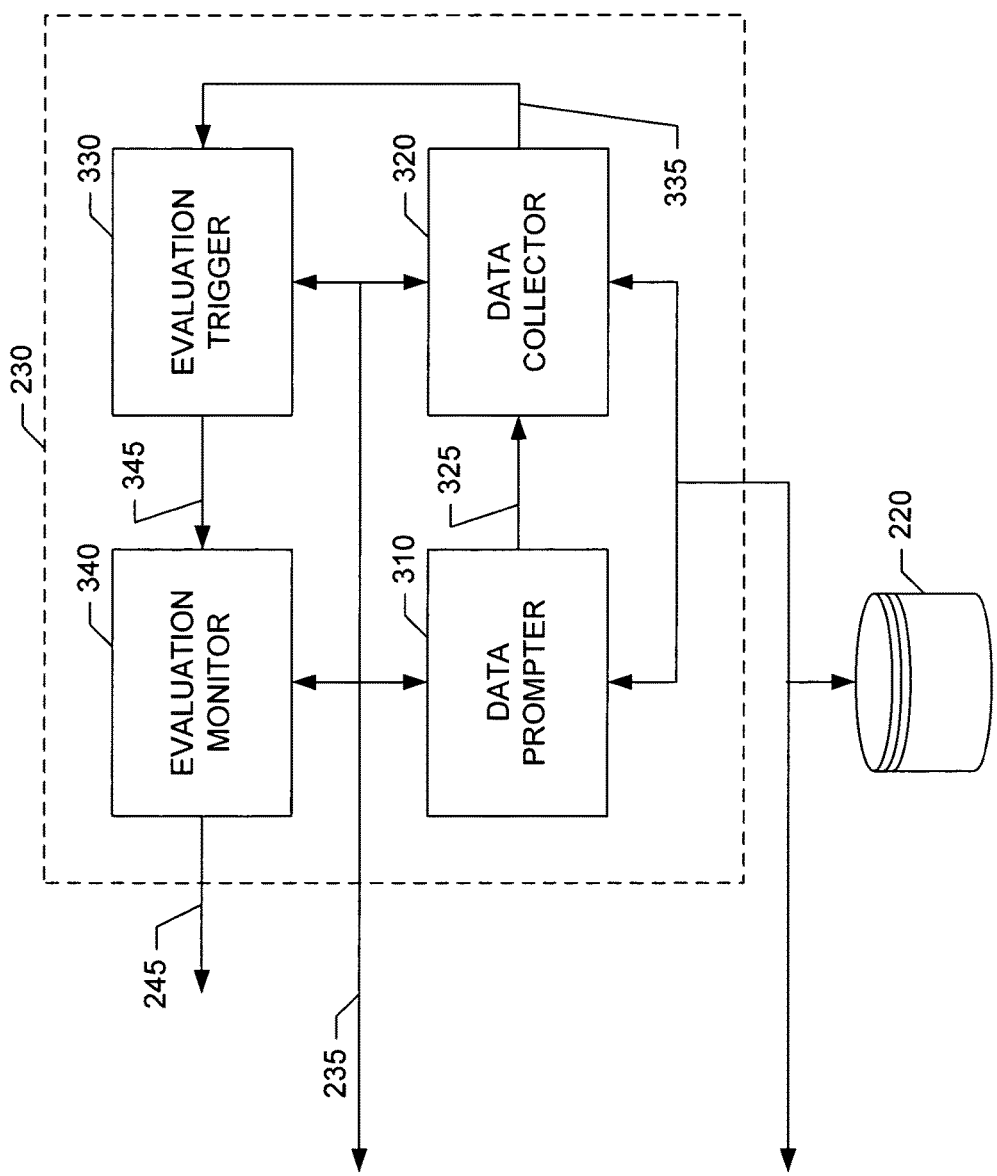
FIG. 3 is a block diagram of an example partner acquisition processor for use by the example PRM channel activator of FIG. 2.

A more detailed block diagram of an example implementation of the partner acquisition processor 230 is provided in FIG. 3. As discussed previously, the operation of the partner acquisition processor 230 may be triggered, for example, by the PRM application 140, via the interface 235 as shown, at an appropriate time, such as to prompt the client company 110 to provide information and/or upon receipt of information from the client company 110 via the user interface 210. The example partner acquisition processor 230 includes a data prompter 310 configured to prompt the client company 110 (or a particular person or department at the client company 110) to provide company information via, for example, the user interface 210. More specifically, the example data prompter 310 may be configured to prompt the client company 110 to complete an electronic (e.g., online) application and/or an electronic NDA to enable evaluation of the client company 110 as a potential distribution channel provider. Prompting of the client company 110 (or a particular person or department at the client company 110) may take the form of communications, such as, but not limited to, electronic messages, such as email messages, instant messages, etc., and/or voice messages, such as voicemail, and automated phone call, etc.

The example partner acquisition processor 230 also includes a data collector 320 configured to collect the information provided by the client company 110, for example, after prompting by the data prompter 310. Operation of the data collector 320 may be triggered at an appropriate time (e.g., such as after the client company 110 has been prompted to provide information) by the PRM application 140, via the interface 235 as shown, and/or by the data prompter 310, via the interface 325 as shown. The data collector 320 is configured to collect information from the client company 110 to enable evaluation of the client company 110 as a potential distribution channel provider. Such information may include, but is not limited to, characteristics of the host company's products and/or services the client company 110 proposes to distribute and/or purchase, such as expected quantity per unit time period, particular bundling of products and/or services into offerings unique to the client company 110, proposed pricing, proposed billing methods, etc. The information may also include, but is not limited to, characteristics of the distribution facilities of the client company 110, such as location, capacity, etc. The example data collector 320 is further configured to store the received information in the database 220.

The example partner acquisition processor 230 includes an evaluation trigger 330 configured to trigger some or all of the host company business departments associated with one or more of the computers 150-156 to process (e.g., evaluate) the information received from the client company 110 by the data collector 320. Operation of the evaluation trigger 330 may be triggered at an appropriate time (e.g., such as after all information has been received by the client company 110) by the PRM application 140, via the interface 235 as shown, and/or by the data collector 320, via the interface 335 as shown. The evaluation trigger 330 may use the communication interface 260, through the PRM application 140 via the interface 235 (as shown) or directly (not shown), to generate an appropriate communication to trigger one or more host company business departments to process the received information. As discussed previously, such communications may take the form of, but are not limited to, electronic messages, such as email messages, instant messages, etc., and/or voice messages, such as voicemail, and automated phone call, etc.

Additionally, the example partner acquisition processor 230 includes an evaluation monitor 240 configured to monitor for indications received from the one or more host company business departments processing the information received from the client company 110. Operation of the evaluation monitor 240 may be triggered at an appropriate time (e.g., such as after the one or more host company business departments have been triggered to process the information received from the client company 110) by the PRM application 140, via the interface 235 as shown, and/or by the evaluation trigger 330, via the interface 345 as shown, to monitor for indications coming from the one or more host company business departments. As discussed previously, such indications may include, but are not limited to, electronic messages, such as email messages, instant messages, etc., and/or voice messages, such as voicemail, automated phone call, etc. The evaluation monitor 340 may use the communication interface 260, through the PRM application 140 via the interface 235 (as shown) or directly (not shown), to receive the indications.

If the received indications indicate that one or more of the host company business departments requires additional information from the client company 110, the evaluation monitor 340 may be configured to trigger the data prompter 310 to prompt the client company 110 to provide the required information. Additionally or alternatively, the evaluation monitor 340 may be configured to generate a trigger, over the interface 245 as shown, to enable triggering of, for example, operation of the channel configuration processor 240 of FIG. 2 at an appropriate time (e.g., such as when indications from all appropriate host company business departments have been received and all indication indicate the potential distribution channel is approved).

Figure 4:
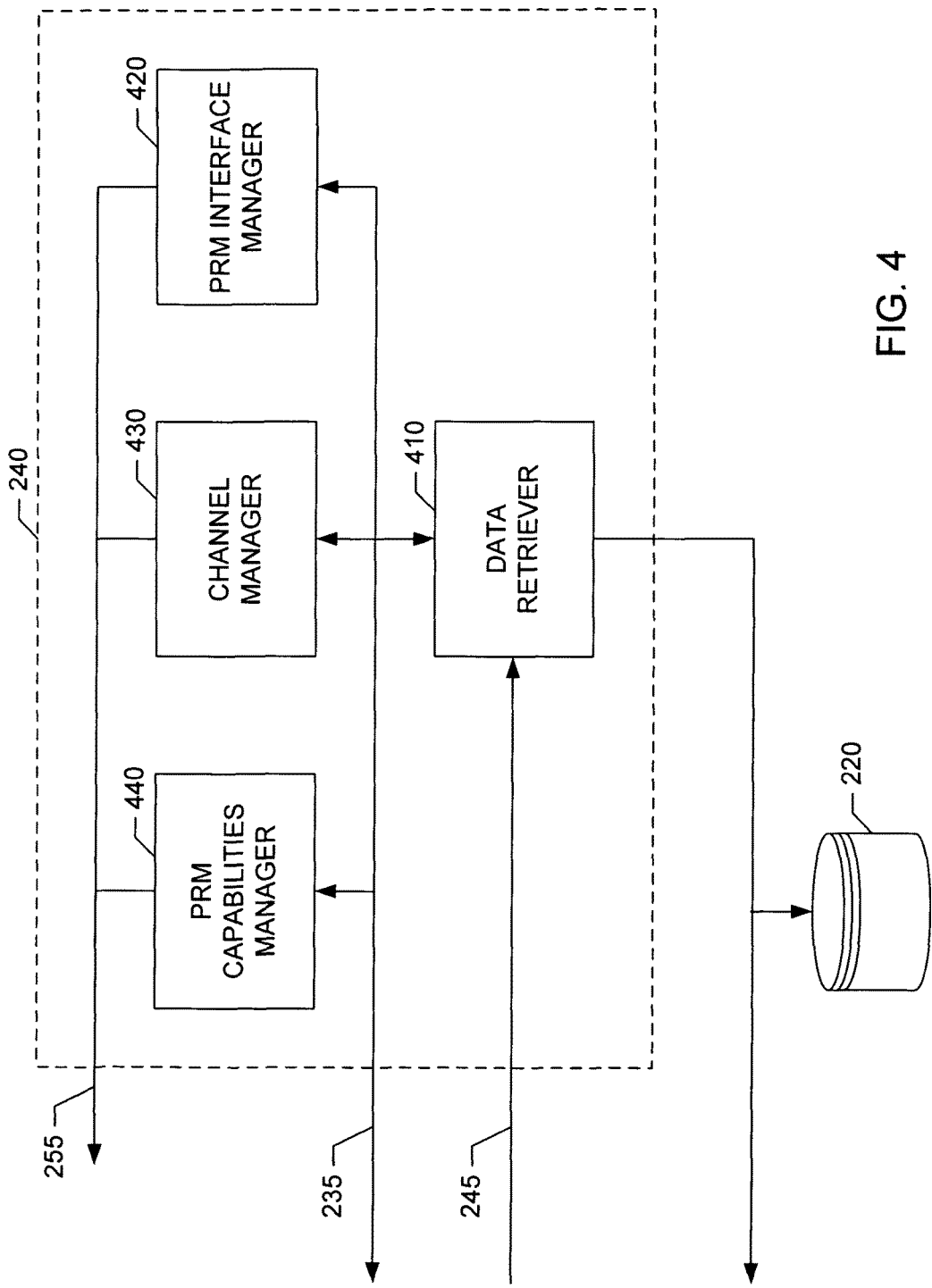
FIG. 4 is a block diagram of an example channel configuration processor for use by the example PRM channel activator of FIG. 2.

A more detailed block diagram of an example implementation of the channel configuration processor 240 is provided in FIG. 4. As discussed previously, operation of the channel configuration processor 240 may be triggered, for example, by the PRM application 140, via the interface 235 as shown, and/or the partner acquisition processor 230 of FIG. 2, via the interface 245 as shown, at an appropriate time, such as upon approval of the client company 110 as a distribution channel provider. The example channel configuration processor 240 includes a data retriever 410 configured to retrieve information provided by the client company 110 (e.g., via the data prompter 310 and/or the data collector 320 of FIG. 3) to enable configuration of the parameters of the distribution channel to be provided by the client company 110. The data retriever 410 may retrieve the information provided by the client company 110 from, for example, the PRM application 140 and/or the database 220.

The example channel configuration processor 240 includes a PRM interface manager 420 configured, for example, to create a profile for use by the client company 110 with the PRM application 140. The client company profile may provide, for example, the client company 110 with access to some or all of the features supported by the PRM application 140, such as displaying real-time information concerning the host company's product and/or service offerings, inventory, pricing, shipping availability, etc., which may be tailored to the specific client company 110. Furthermore, the client company profile may be configured to provide input information to the PRM application 140 to allow the PRM application 140 to generate data specific to the distribution channel provided by the client company 110. Additionally, the client company profile may be configured to restrict access to only the portions of the PRM application 140 relevant to the products and/or services to be distributed and/or purchased by the client company 110. Furthermore, the PRM interface manager 420 may be configured, additionally or alternatively, to create one or more client company accounts that interface with the PRM application 140 and are accessible by the client company 110 to enable processing and managing of the distribution channel based on the client company profile.

The example channel configuration processor 240 also includes a channel manager 430 configured to create distribution codes and/or other identifiers to enable, for example, tracking of products and/or services to be distributed and/or purchased by the client company 110 through the distribution channel. The example channel configuration processor 240 further includes a PRM capabilities manager 440 configured to, for example, enable the reporting capabilities of the PRM application 140 requested or required by the client company 110. Such reporting capabilities may include, for example, generating standardized and/or customized sales reports, billing reports, compensation reports, etc.

Operation of the PRM interface manager 420, the channel manager 430 and/or the PRM capabilities manager 440 may be triggered at an appropriate time (e.g., such as after information received from the client company 110 has been retrieved by the data retriever 410) by the PRM application 140, via the interface 235 as shown, and/or by the data retriever 410, via the interface 235 as shown. Furthermore, one or more of the PRM interface manager 420, the channel manager 430 and/or the PRM capabilities manager 440 may be configured to generate a trigger, over the interface 255 as shown, to enable triggering of, for example, operation of the channel implementation processor 250 of FIG. 2 at an appropriate time (e.g., such as after configuration of the distribution channel parameters is complete).

Figure 5:
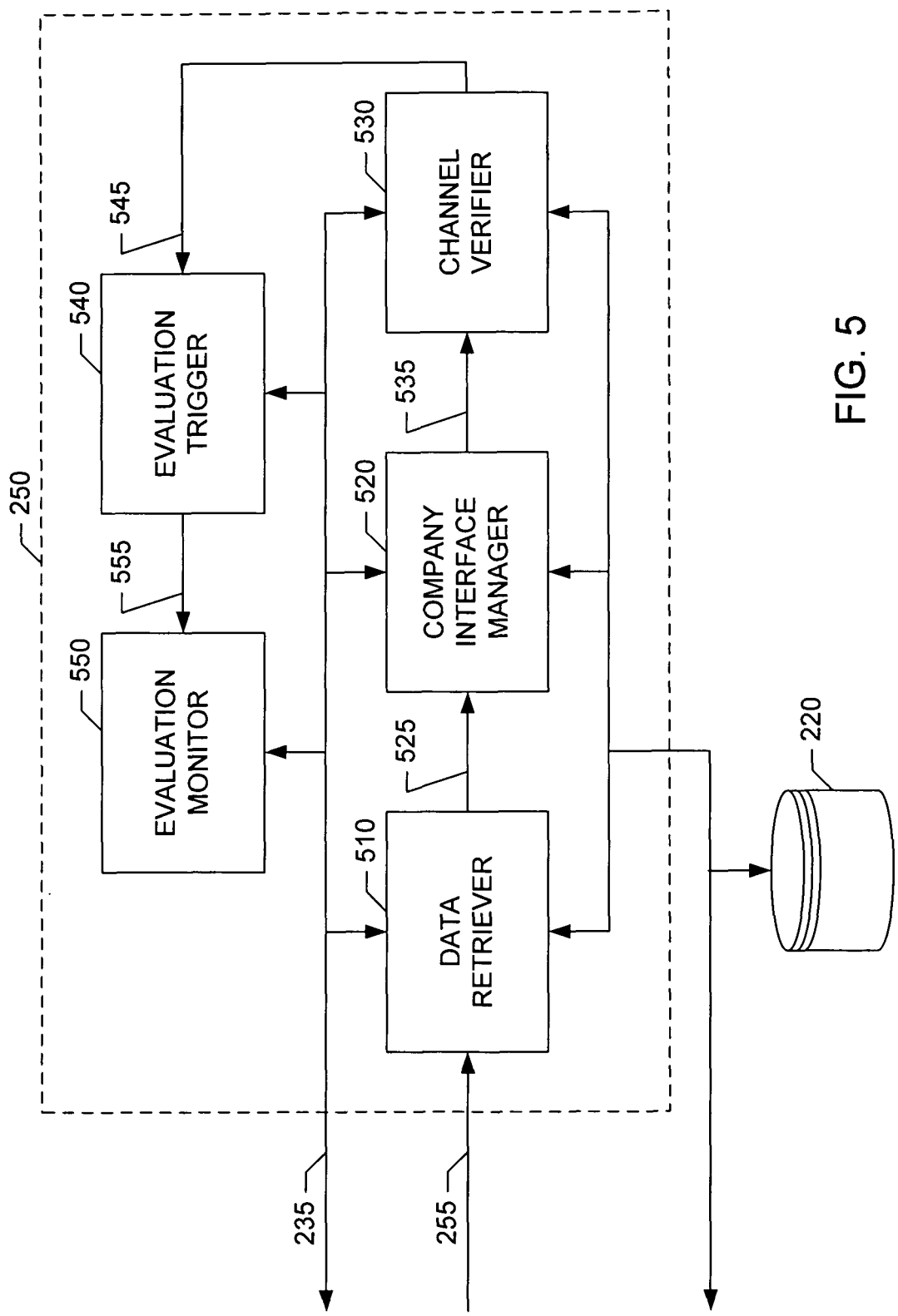
FIG. 5 is a block diagram of an example channel implementation processor for use by the example PRM channel activator of FIG. 2.

A more detailed block diagram of an example implementation of the channel implementation processor 250 is provided in FIG. 5. As discussed above, operation of the channel implementation processor 250 may be triggered, for example, by the PRM application 140, via the interface 235 as shown, and/or the channel configuration processor 240 of FIG. 2, via the interface 255 as shown, at an appropriate time, such as upon configuration of the parameters of the distribution channel to be provided by the client company 110. The example channel implementation processor 250 includes a data retriever 510 configured to retrieve information provided by the client company 110 (e.g., via the data prompter 310 and/or the data collector 320 of FIG. 3) to enable implementation of the distribution channel to be provided by the client company 110. The data retriever 510 may retrieve the information provided by the client company 110 from, for example, the PRM application 140 and/or the database 220.

The example channel implementation processor 250 also includes a company interface manager 520 configured to establish a secure electronic interface between the client company 110 and the host company 120 over, for example, the communication network 190 of FIG. 1. Establishing the secure electronic interface may include enabling authentication and/or encryption over the communication network using any known technology provided by one or more security technology vendors. The company interface manager 520 may use the information retrieved by the data retriever 510 to configure the authentication and/or encryption parameters. Operation of the company interface manager 520 may be triggered at an appropriate time (e.g., such as after information received from the client company 110 has been retrieved by the data retriever 510) by the PRM application 140, via the interface 235 as shown, and/or by the data retriever 510, via the interface 525 as shown.

The example channel implementation processor 250 also includes a channel verifier 530 configured to test the distribution channel interface implemented by the client company 110. For example, the client company 110 may create client company accounts to access the secure communication interface and/or develop applications to implement the distribution channel over the secure communication interface. The applications may be, for example, one or more web applications implemented based on application programming interface (API) development kits provided by the host company 120. After the client company 110 develops its distribution channel application(s), the channel verifier 530 enables verification of the distribution channel, for example, by executing test scripts, generating test reports, capturing screenshots, etc. Operation of the channel verifier 530 may be triggered at an appropriate time (e.g., such as after the client company 110 completes developing its distribution channel applications) by the PRM application 140, via the interface 235 as shown, and/or by the company interface manager 520, via the interface 535 as shown.

The example channel implementation processor 250 further includes an evaluation trigger 540 configured to trigger some or all of the host company business departments associated with one or more of the computers 150-156 to process (e.g., evaluate) the distribution channel verification results obtained by the channel verifier 530. Operation of the evaluation trigger 540 may be triggered at an appropriate time (e.g., such as after all test results have been obtained) by the PRM application 140, via the interface 235 as shown, and/or by the channel verifier 530, via the interface 545 as shown. The evaluation trigger 540 may use the communication interface 260, through the PRM application 140 via the interface 235 (as shown) or directly (not shown), to generate an appropriate communication to trigger one or more host company business departments to process the distribution channel verification results. As discussed previously, such communications may take the form, but are not limited to, electronic messages, such as email messages, instant messages, etc., and/or voice messages, such as voicemail, automated phone call, etc.

Additionally, the example channel implementation processor 250 includes an evaluation monitor 550 configured to monitor for indications received from the one or more host company business departments processing the distribution channel verification results. Operation of the evaluation monitor 550 may be triggered at an appropriate time (e.g., such as after the one or more host company business departments have been triggered to process the validation test results) by the PRM application 140, via the interface 235 as shown, and/or by the evaluation trigger 540, via the interface 555 as shown, to monitor for indications coming from the one or more host company business departments. As discussed previously, such indications may include, but are not limited to, electronic messages, such as email messages, instant messages, etc., and/or voice messages, such as voicemail, automated phone call, etc. The evaluation monitor 550 may use the communication interface 260, through the PRM application 140 via the interface 235 (as shown) or directly (not shown), to receive the indications. Furthermore, if the received indications indicate that the distribution channel verification results have not been approved, the evaluation monitor 340 may be configured to trigger the channel verifier 530 to perform further verification and/or cause the client company 110 to modify its distribution channel application(s).

Flowcharts representative of example processes that may be used, at least in part, to implement the example PRM application 140 and/or the example PRM channel activator 200 of FIG. 2, the example partner acquisition processor 230 of FIGS. 2 and/or 3, the example channel configuration processor 240 of FIGS. 2 and/or 4, and/or the example channel implementation processor 250 of FIGS. 2 and/or 5 are shown in FIGS. 6-9. In these examples, the processes represented by each flowchart, or portions thereof, may be implemented by machine readable instructions which may comprise one or more programs for execution by: (a) a processor, such as the processor 2012 shown in the example computer 2000 discussed below in connection with FIG. 20, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 2012, but persons of ordinary skill in the art will readily appreciate that the entire program or programs and/or portions thereof could alternatively be executed by a device other than the processor 2012 and/or embodied in firmware or dedicated hardware in a well-known manner (e.g., implemented by an application specific integrated circuit (ASIC), a programmable logic device (PLD), a field programmable logic device (FPLD), discrete logic, etc.). For example, any or all of the distribution channel activation process of FIG. 6, the partner acquisition process of FIG. 7, the channel configuration process of FIG. 8, and/or the channel development and verification process of FIG. 9 could be implemented by any combination of software, hardware, and/or firmware. Also, as discussed below, portions of the processes represented by the flowchart of FIGS. 6-9 may be implemented manually or manually in combination with automatic processing. Further, although the example processes are described with reference to the flowcharts illustrated in FIGS. 6-9, persons of ordinary skill in the art will readily appreciate that many other techniques for implementing the example methods and apparatus described herein may alternatively be used. For example, with reference to the flowcharts illustrated in FIGS. 6-9, the order of execution of the blocks may be changed, and/or some of the blocks described may be changed, eliminated, combined and/or subdivided into multiple blocks.

Figure 6:
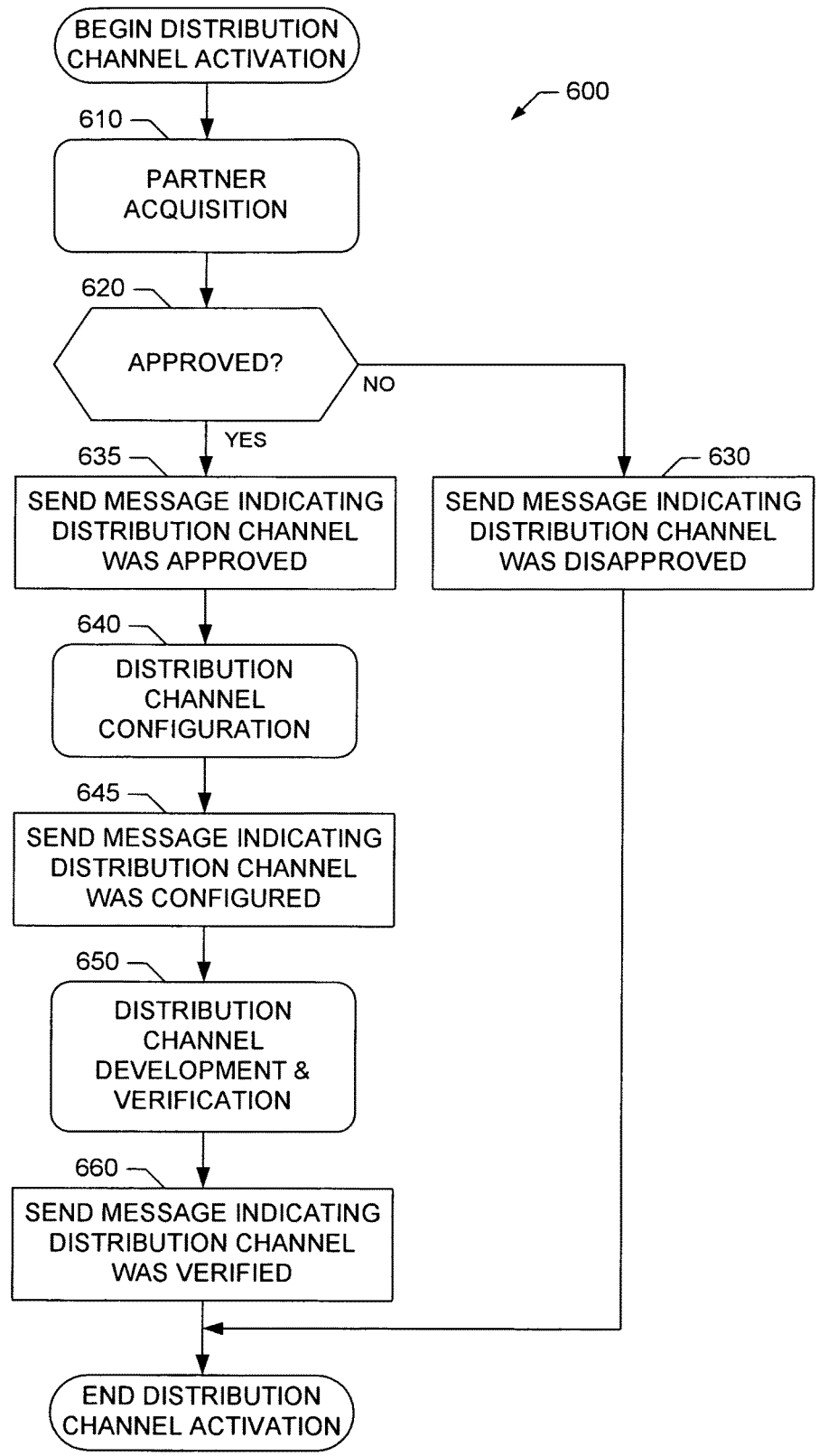
FIG. 6 is a flowchart representative of an example automatic distribution channel activation process that may be used, at least in part, to implement the example PRM channel activator of FIG. 2.

An example process 600 to automatically activate distribution channels provided by business partners that may be used, at least in part, to implement the PRM application 140 and/or the PRM channel activator 200 of FIG. 2 is shown in FIG. 6. Referring also to the example environment of use 100 of FIG. 1, the example distribution channel activation process 600 may be triggered, for example, when the host company 120 approaches the client company 110 with a request to provide a distribution channel. Alternatively or additionally, the example distribution channel activation process 600 may be triggered, for example, when the client company 110 contacts the host company 120 to offer to provide a distribution channel. Alternatively or additionally, the example distribution channel activation process 600 may be configured, for example, to execute at predetermined intervals or upon predetermined events to allow the host company 120 to renew requests to provide distribution channels to a known group of client companies 110. Alternatively of additionally, the example distribution channel activation process 600 may be configured, for example, to execute at predetermined intervals or upon predetermined events to process a plurality of offers received from one or more client companies 110 to provide one or more distribution channels for the host company 120.

The example distribution channel activation process 600 begins with execution of a partner acquisition process 610 by, for example, the PRM channel activator 200. An example partner acquisition process 610 is configured to identify a potential client company 110 to provide a distribution channel for the host company 120 and to obtain approval from the host company 120 to pursue activation of this distribution channel. An example partner acquisition process 610 is discussed below in greater detail in connection with FIG. 7.

If the host company 120 does not approve the distribution channel to be provided by the client company 120 (block 620), control proceeds to block 630 at which the PRM channel activator 200 is configured to send a message to the client company 110 indicating disapproval of the distribution channel. For example, at block 630 the distribution channel PRM channel activator 200 (possibly in conjunction with the PRM application 140) may be configured to automatically send an electronic message, such as an email message, an instant message, etc., or a voice message, such as a voicemail or automated phone call, to an appropriate contact person at the client company 10 who is to receive notice of the disapproval. Additionally or alternatively, the PRM channel activator 200 (possibly in conjunction with the PRM application 140) may be configured to automatically send an electronic message, such as an email message, an instant message, etc., or a voice message, such as a voicemail or automated phone call, to an appropriate business department or person in the host company 120 to trigger a personalized delivery of the disapproval decision to the client company 110. The example distribution channel activation process 600 then ends.

If, however, the host company 120 approves the distribution channel to be provided by the client company 110 (block 620), control proceeds to block 635 at which the PRM channel activator 200 is configured to send a message to the client company 110 to indicate approval and to initiate configuration of the distribution channel. For example, the PRM channel activator 200 (possibly in conjunction with the PRM application 140) may be configured to automatically send an electronic message, such as an email message, an instant message, etc., or a voice message, such as a voicemail or automated phone call, to an appropriate contact person at the client company 110 who is to receive notice of the approval. Additionally or alternatively, the PRM channel activator 200 (possibly in conjunction with the PRM application 140) may be configured to automatically send an electronic message, such as an email message, an instant message, etc., or a voice message, such as a voicemail or automated phone call, to an appropriate business department or person in the host company 120 to trigger a personalized delivery of the approval decision to the client company 110 and/or aggregator. If appropriate, the PRM channel activator 200 (possibly in conjunction with the PRM application 140) may also be configured to use similar techniques to contact an aggregator who has been contracted by the client company 110 to design and implement the distribution channel for the client company 110.

After processing at block 635 completes, the PRM channel activator 200 calls a distribution channel configuration process 640. An example channel configuration process 640 is configured to create profiles, user accounts, parameters and reporting requirements associated with the client company 110 and its distribution channel. An example channel configuration process 640 is discussed below in greater detail in connection with FIG. 8.

After the channel configuration process 640 completes, control proceeds to block 645 at which the PRM channel activator 200 is configured to send a message to the client company 110 and/or aggregator contracted by the client company 110 to indicate configuration of the distribution channel is complete. For example, the PRM channel activator 200 (possibly in conjunction with the PRM application 140) may be configured to automatically send an electronic message, such as an email message, an instant message, etc., or a voice message, such as a voicemail or automated phone call, to an appropriate contact person at the client company 110 and/or aggregator who is to receive notice of distribution channel configuration status. Additionally or alternatively, the PRM channel activator 200 (possibly in conjunction with the PRM application 140) may be configured to automatically send an electronic message, such as an email message, an instant message, etc., or a voice message, such as a voicemail or automated phone call, to an appropriate business department or person in the host company 120 to trigger a personalized delivery of the distribution channel configuration status to the client company 110 and/or aggregator.

After processing at block 645 completes, the PRM channel activator 200 then calls a distribution channel development and verification process 650. An example distribution channel development and verification process 650 is configured to establish a secure electronic interface between the host company 120 and the client company 110 and to obtain verification from the host company 120 that the resulting distribution channel based on the secure electronic interface meets the requirements of the host company 120. An example distribution channel development and verification process 650 is discussed below in greater detail in connection with FIG. 9.

After the distribution channel development and verification process 650 completes, control proceeds to block 660 at which the PRM channel activator 200 activates the distribution channel by sending a message to the client company 110 indicating final approval of the distribution channel. For example, at block 660 the PRM channel activator 200 (possibly in conjunction with the PRM application 140) may be configured to automatically send an electronic message, such as an email message, an instant message, etc., or a voice message, such as a voicemail or automated phone call, to an appropriate contact person at the client company 110 and/or aggregator who is to receive notice of the approval. Additionally or alternatively, the PRM channel activator 200 (possibly in conjunction with the PRM application 140) may be configured to automatically send an electronic message, such as an email message, an instant message, etc., or a voice message, such as a voicemail or automated phone call, to an appropriate business department or person in the host company 120 to trigger a personalized delivery of the approval decision to the client company 110 and/or aggregator. The example distribution channel activation process 600 then ends.

Persons of ordinary skill in the art will readily appreciate that, although in the interest of brevity and clarity, the process of FIG. 6 was described with reference to a single acquisition process, multiple instances of the process of FIG. 6 may be executed in parallel (e.g., multiple threads executing in parallel) to enable multiple partner acquisition processes to be evaluated at generally the same time.

Figure 7:
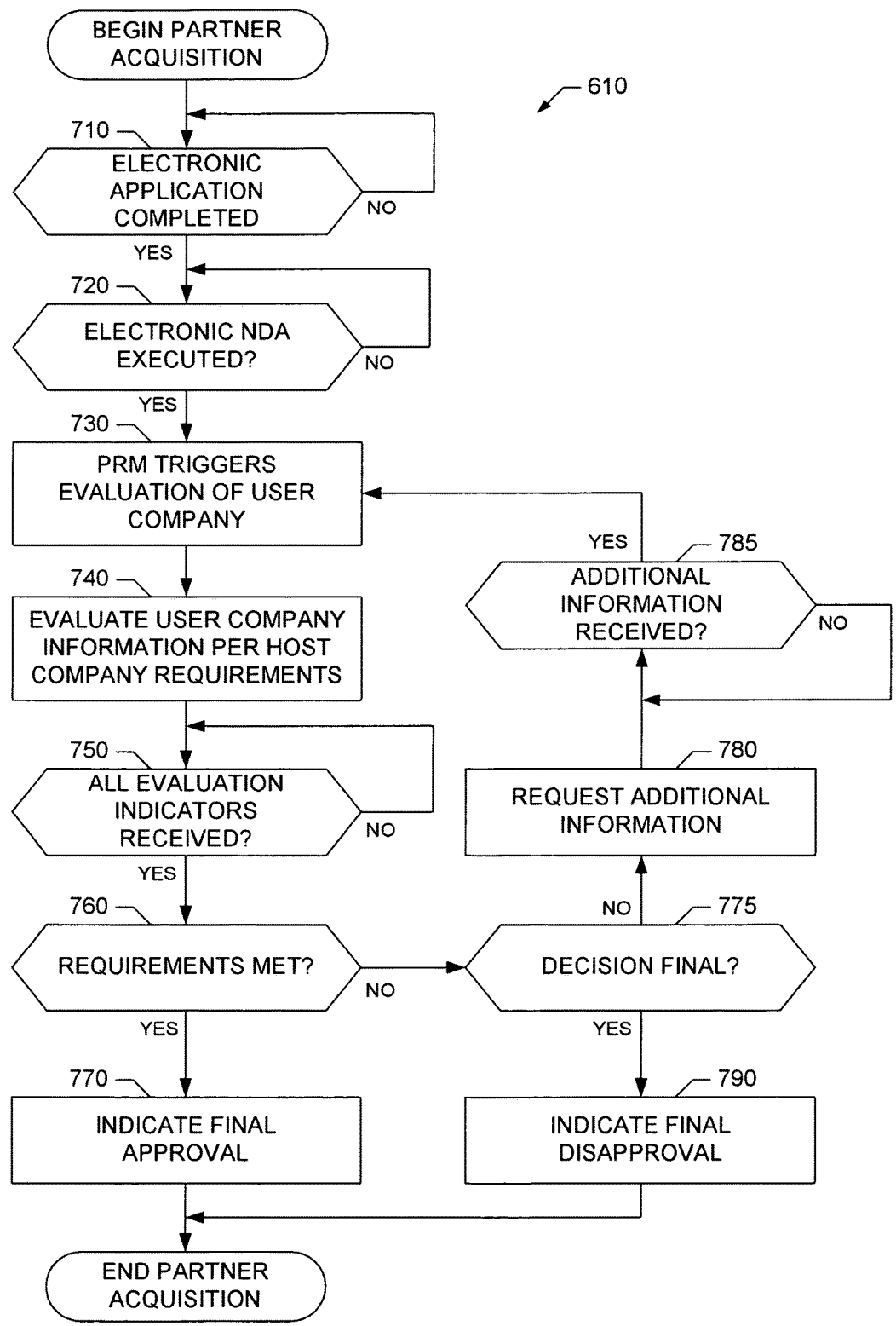
FIG. 7 is a flowchart representative of an example partner acquisition process that may be used, at least in part, to implement the example partner acquisition processor of FIG. 3.

FIG. 7 illustrates an example partner acquisition process 610 that may be used to implement block 610 of the example distribution channel activation process 600 of FIG. 6. The example partner acquisition process 610 may also be used, at least in part, to implement the example partner acquisition processor 230 of FIGS. 2 and/or 3. Referring also to the example environment of use 100 of FIG. 1, the partner acquisition process 610 may be executed to process offers by the client company 110 to provide a distribution channel for the host company 120. Additionally or alternatively, the partner acquisition process 610 may be executed in response to an inquiry made by the host company 120 to the client company 110 concerning whether the client company would be interested in providing a distribution channel for the host company 120.

The example partner acquisition process 610 begins at block 710 at which the partner acquisition processor 230 provides the client company 110 with an electronic application to be evaluated by the host company 120 (e.g., an offer to provide a distribution channel). The electronic application may be configured, for example, as an electronic form provided by a web page served by the server 130 and accessible by any appropriate Internet connection. The information requested by the electronic application and provided by the client company 110 may include, for example, characteristics of the host company's products and/or services the client company 110 proposes to distribute and/or purchase, such as expected quantity per unit time period, particular bundling of products and/or services into offerings unique to the client company 110, proposed pricing, proposed billing methods, etc. The information may also include characteristics of the distribution facilities of the client company 110, such as location, capacity, etc. After the client company 110 completes entering its information into the electronic application, the partner acquisition processor 230 provides the information to the PRM application 140 and/or stores the information in the database 220 such that the information may then be made accessible by some or all of the host company business departments to facilitate processing of the electronic application. Control then proceeds to block 720.

At block 720, partner acquisition processor 230 enables the client company 110 to execute an electronic non-disclosure agreement (NDA), or any other appropriate confidentiality agreement, with the host company 120. As in the case of the electronic application, the electronic NDA may be configured, for example, as an electronic form provided by a web page served by the server 130 and accessible by any appropriate internet connection. The electronic NDA may contain, for example, standard terms required by the host company 120 or it may be customizable for a particular business relationship. The electronic NDA may also contain provisions to allow the client company 110 to modify the terms of the NDA. Upon completion of the electronic NDA by the client company 110, the partner acquisition processor 230 provides the contents of the NDA (e.g., any customizable terms, modified terms, etc.) and/or an NDA completion indicator to the PRM application 140 and/or the database 220 such that this information may then be made accessible by some or all of the host company business departments to facilitate processing of the agreement. Control then proceeds to block 730.

At block 730, the partner acquisition processor 230 (possibly in conjunction with the PRM application 140) triggers some or all of its various host company business departments to begin processing the completed electronic application and/or NDA. For example, the PRM application 140 executing on the server 130 may be configured to automatically send an electronic message, such as an email message, an instant message, etc., to some or all or the computers 150-156 associated with respective some or all of the host company business departments to indicate that the completed electronic application and NDA have been received and are ready to be evaluated. Alternatively or additionally, the PRM application 140 may be configured to automatically send a voice message, such as a voicemail or automated phone call, to an appropriate contact person in some or all of the host company business departments to initiate the evaluation. Control then proceeds to block 740 at which the appropriate host company business department or departments evaluate the electronic application and/or NDA to determine whether the distribution channel to be provided by the client company 110 meets predetermined qualifications required by the host company 120. For example, such qualifications may include locations of the distribution facilities of the client company 120, estimated volume of products and/or services to be distributed and/or purchased, pricing requirements, etc. Alternatively, the host company 120 may set no predetermined qualifications and, thus, automatically accept any distribution channel offer by the client company 110.

After the host company business department or departments complete their respective evaluations at block 740, control proceeds to block 750 at which the partner acquisition processor 230 (possibly in conjunction with the PRM application 140) monitors for evaluation indicators to be returned by the host company business department or departments. The evaluation indicators may indicate, for example, the electronic application and/or NDA have been approved, have been disapproved, have been tentatively disapproved with a request for additional information, etc. For example, the computers 150-156 associated with the respective some or all of the host company business departments which evaluated the electronic application and/or NDA may be used to send an electronic message, such as an email message, an instant message, etc., to the partner acquisition processor 230 and/or PRM application 140. Alternatively or additionally, appropriate contact personnel in some or all of the host company business departments may call a voice menu system (e.g., an interactive voice response unit) interfaced to the partner acquisition processor 230 and/or PRM application 140 to enter the appropriate evaluation indicators corresponding to their respective evaluations. After all evaluation indicators are received, the partner acquisition processor 230 compiles the results of the evaluation.

If the evaluation indicators indicate that all of the qualifications have been met and, thus, that all appropriate business departments have responded with approval (block 760), control proceeds to block 770 at which the partner acquisition processor 230 outputs a final approval indicator. Such a final approval indicator may be used, for example, as shown in the example distribution channel activation process 600 of FIG. 6 to determine whether to inform the client company 110 that its prospective distribution channel has been approved. The example partner acquisition process 610 then ends.

If, however, the evaluation indicators indicate that all of the qualifications have not been met and, thus, that all appropriate business departments have not responded with approval (block 760), the partner acquisition processor 230 determines whether the evaluation indicators indicate a final disapproval of the distribution channel (block 775). For example, a final disapproval may be determined if the evaluation indicator of just one of the business departments indicates disapproval with no request for additional information. If the disapproval is not final (block 775), control proceeds to block 780 at which the partner acquisition processor 230 requests that the client company 110 provide the required additional information, for example, as indicated in the evaluation indicators returned by the host company business departments. Control then proceeds to block 785.

At block 785, the partner acquisition processor 230 waits for the client company 110 to respond with the requested information 785. Upon receipt of the client company's response, control returns to block 730 and blocks subsequent thereto at which the partner acquisition processor 230 provides the additional information to the PRM application 140 and/or the database 220 such that this information may then be made accessible to some or all of the host company business departments for further processing. The partner acquisition processor 230 (possibly in conjunction with the PRM application 140) then triggers some or all of its various host company business departments to begin processing the additional information (block 740). Persons of ordinary skill in the art will appreciate that such an ability for the host company 120 to request additional information from the client company 110 provides an interaction mechanism which facilitates collaboration between the host company 120 and the client company 110 on, for example, contract terms, NDA terms and the like.

Returning to block 775, if the disapproval of the application and/or NDA is final (block 775), control proceeds to block 790 at which the partner acquisition processor 230 outputs a final disapproval indicator. Such a final disapproval indicator may be used, for example, as shown in the example distribution channel activation process 600 of FIG. 6 to determine whether to inform the client company 110 that its prospective distribution channel has been disapproved. The example partner acquisition process 610 then ends.

Figure 8:
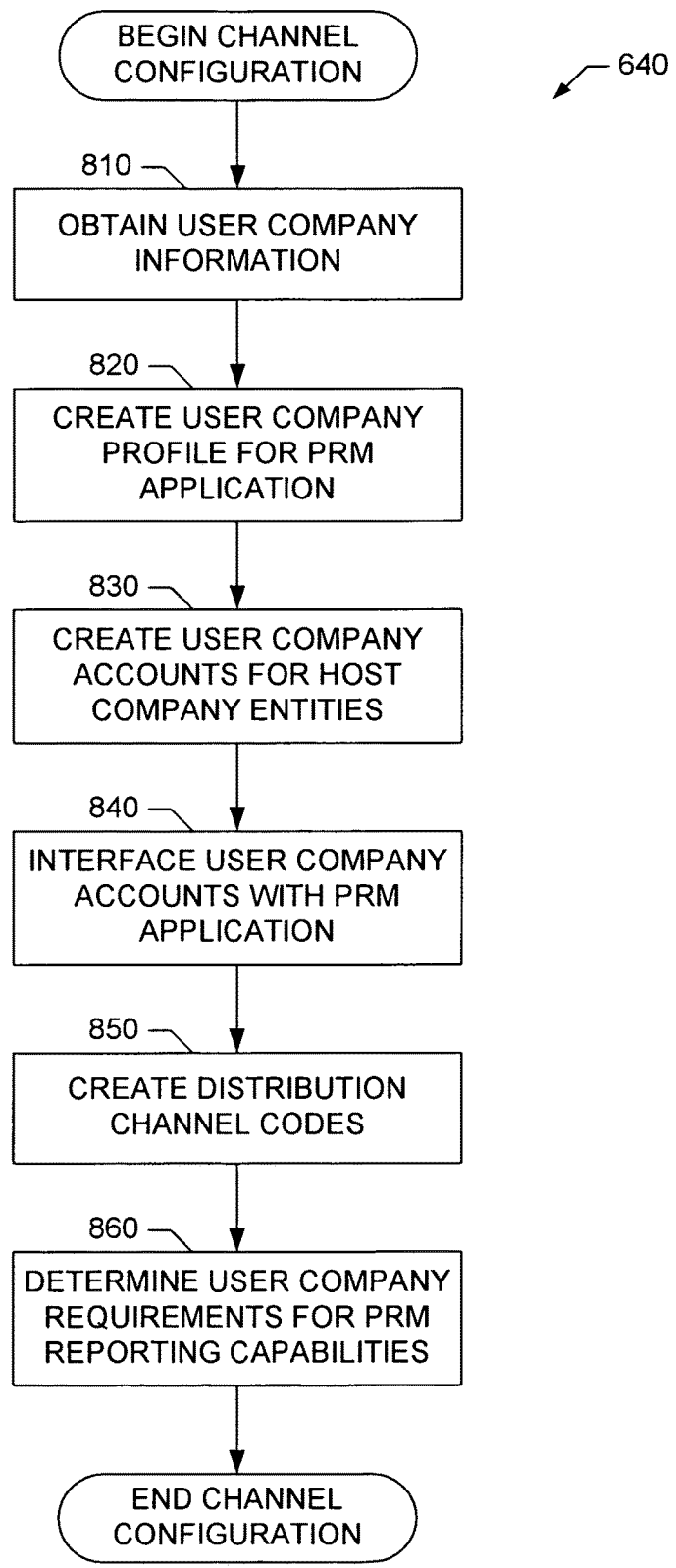
FIG. 8 is a flowchart representative of an example channel configuration process that may be used, at least in part, to implement the example channel configuration processor of FIG. 4.

FIG. 8 illustrates an example channel configuration process 640 that may be used to implement block 640 of the example distribution channel activation process 600 of FIG. 6. The example channel configuration process 640 may also be used, at least in part, to implement the example channel configuration processor 240 of FIGS. 2 and/or 4. Referring also to the example environment of use 100 of FIG. 1, the channel configuration process 640 may be executed to configure a distribution channel to be provided by a client company 110 for a host company 120. The channel configuration process 640 begins at block 810 at which the channel configuration processor 240 obtains information concerning the client company 110 which is needed to configure the distribution channel. For example, such information may correspond to some or all of the information entered into the electronic application by the client company 110 during the partner acquisition process 610 of FIG. 7 and may be retrieved from the PRM application 140 and/or database 220.

Next, control proceeds to block 820 at which a profile is created for the client company 110 for use with the host company's PRM application 140. The client company profile may be created automatically by, for example, the channel configuration processor 240, the PRM application 140 or by another application executing on the server 130, or it may be created manually by, for example, an information technology (IT) administrator. The client company profile may provide, for example, the client company 110 with access to some or all of the features supported by the PRM application 140, such as displaying real-time information concerning the host company's product and/or service offerings, inventory, pricing, shipping availability, etc., which may be tailored to the specific client company 110. For example, the client company profile may allow the PRM application 140 to provide tailored pricing or quantity information based on expected volume to be distributed and/or purchased, or based on the priority of that client company 110 in the host company's business objectives. Furthermore, the client company profile may be configured to provide input information to the PRM application 140, such as product and/or service types, product and/or service quotas, billing procedures, compensation procedures, pricing discounts based on quotas, billing procedures and/or compensation procedures, etc., to allow the PRM application 140 to generate data specific to the distribution channel provided by the client company 110, such as unit product price, unit service price, price for particular bundles of products and/or services, available quantities of products and/or services, etc. Additionally, the client company profile may be configured to restrict access to only the portions of the PRM application 140 relevant to the products and/or services to be distributed and/or purchased by the client company 110.

After processing at block 820 completes, control proceeds to clock 830 at which the channel configuration processor 240 creates one or more client company accounts accessible by some or all of the computers 150-156 associated with some or all of the host company business departments to allow these departments to process and manage the distribution channel to be provided by the client company 110. Then, at block 840, the client company accounts are interfaced with the PRM application 140 and/or other applications executing on the server 130. The interface may exist as message transfers over a computer network and may take the form of data transfers, file transfers, email messages, instant messages, and/or the like. As in the case of creating the client company profile, the client company accounts may be created and interfaced automatically by, for example, the channel configuration processor 240, the PRM application 140 or by another application executing on the server 130, or they may be created manually by, for example, an IT administrator. The client company accounts allow the host company business departments to process information received from the client company 110 (e.g., such as product and/or service orders, promotion requests, etc.), to update information in the client company profile, to update information in the PRM application, such as product and/or service bundle availability, etc.

Next, at block 850, distribution channel codes and/or other identifiers are created to, for example, track products and/or services distributed and/or purchased through the distribution channel provided by the client company 110. Such codes may be created automatically by, for example, the channel configuration processor 240, the PRM application 140 or by another application executing on the server 130, or they may be created manually by, for example, an IT administrator and/or other appropriate personnel in one or more of the host company business departments.

Finally, at block 860 the channel configuration processor 240 determines the reporting capabilities that the client company 110 requires to be generated by the host company's PRM application 140. For example, these reporting capabilities may include generating a sales report based on products and/or services distributed through the distribution channel, a billing report for products and/or services purchased through the distribution channel, a compensation report to indicate reimbursements due the client company, and/or any other standard or customizable report. The reporting requirement information may be stored, for example, in the client company profile, as information in one or more of the client company accounts associated with respective one or more of the host company business departments, etc., and/or any combination thereof. Then, after processing at block 860 completes, the example channel configuration process 640 ends.

Figure 9:
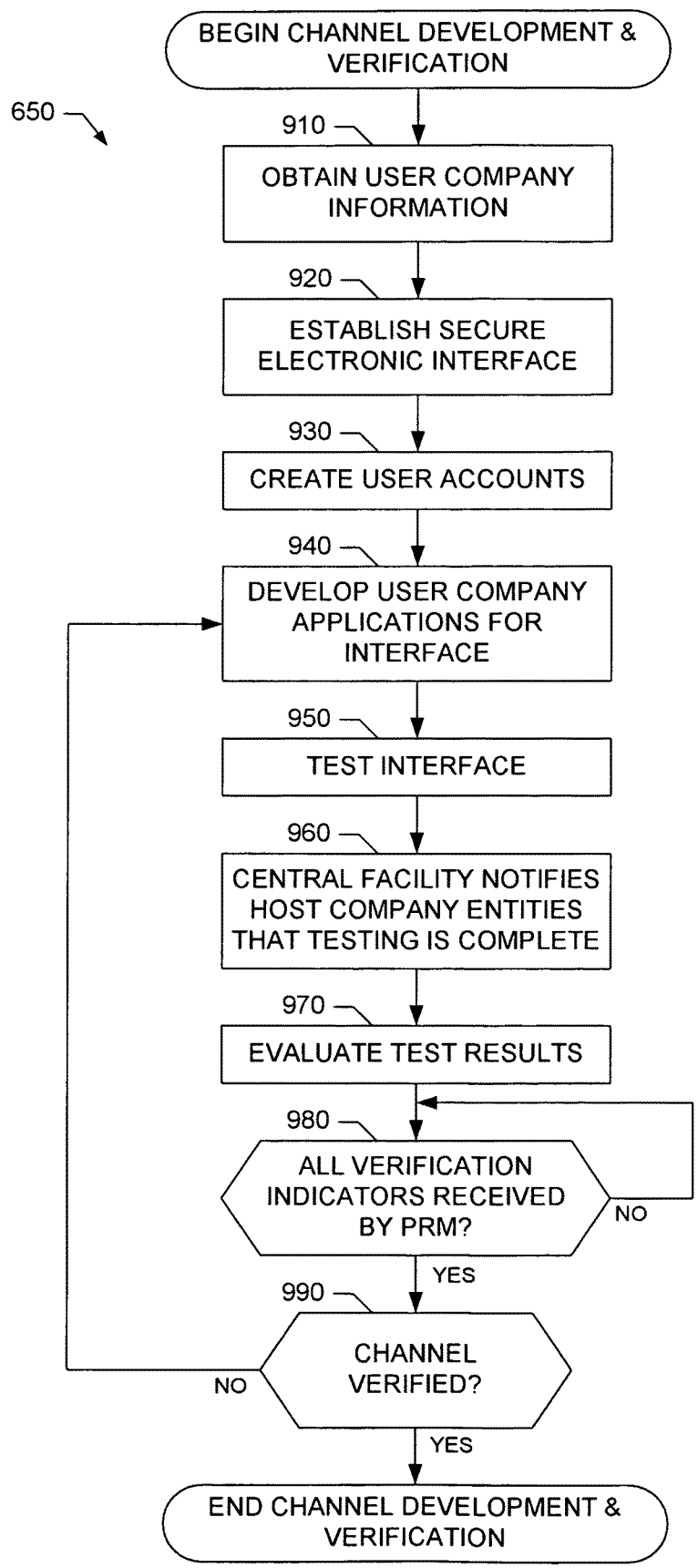
FIG. 9 is a flowchart representative of an example channel development and verification process that may be used, at least in part, to implement the example channel implementation processor of FIG. 5.

FIG. 9 illustrates an example distribution channel development and verification process 650 that may be used to implement block 650 of the example distribution channel activation process 600 of FIG. 6. The example channel development and verification process 640 may also be used, at least in part, to implement the example channel implementation processor 250 of FIGS. 2 and/or 5. Referring also to the example environment of use 100 of FIG. 1, the distribution channel development and verification process 650 may be executed to develop and verify a distribution channel to be provided by a client company 110 for a host company 120. The channel development and verification process 650 begins at block 910 at which the channel implementation processor 250 obtains information concerning the client company 110 which is needed to develop and verify the distribution channel. For example, such information may correspond to some or all of the information entered into the electronic application by the client company 110 during the partner acquisition process 610 of FIG. 7 and may be retrieved from the PRM application 140 and/or database 220.

Next, at block 920, the channel implementation processor 250 establishes a secure electronic interface between the host company 120 and the client company 110, for example, over the communication network 190. Establishing the secure electronic interface may include enabling authentication and encryption over the communication network based on any known technology provided by a similar security technology vendor or vendors. To establish the secure interface, the host company 120 may request appropriate authentication certificate(s) from the security technology vendor and distribute the certificate(s) to the client company 110. The request and distribution of certificates may be performed automatically by, for example, the channel implementation processor 250, the PRM application 140 or by another application executing on the server 130, or the may be preformed manually by, for example, an IT administrator and/or other appropriate personnel in one or more of the host company business departments.

Next, at block 930, the client company 110 establishes one or more user accounts to enable access over the secure communication interface established in block 910 to the PRM application 140 and/or other applications executing on the server 130 at the host company 110. The one or more user accounts are made accessible by the server 160 and/or one or more computers 170-172 associated with one or more respective client company business departments, one or more respective customer access points, one or more respective sales locations, etc. Thus, the client company accounts facilitate the exchange of information, such as in the form of data transfers, file transfers, email messages, instant messages, and the like between the server 160 and/or the one or more computers 170-172 at the client company 110 and the PRM application 140, other applications executing on the server 130 and/or the one or more computers 150-156 at the host company 120.

Then, at block 940 the client company develops one or more applications for its portion of the distribution channel based on the user accounts established at block 930 and the secure communication interface established at block 920. The one or more applications may be, for example, one or more web applications to support the functionality provided by interfacing with the PRM application 140 hosted by the host company 120. For example, such a web application may support displaying the host company's inventory of products and/or services, placing orders for products and/or services, displaying pricing information, making bids, requesting and displaying various reports, etc. Furthermore, the host company 120 may provide the client company 110 with application programming interface (API) development kits to simplify the creation of applications which interface with its PRM application 140 and/or other applications executing on its server 130. After the one or more applications are developed at block 940, the resulting distribution channel interface between the client company 110 and host company 120 is tested at block 950 to ensure that communications over the interface are properly secure and that the client company applications developed at block 940 are operating properly.

After testing at block 950 completes, control proceeds to block 960 at which the channel implementation processor 250 notifies some or all of the host company business departments that testing is complete and the test results for the distribution channel may be evaluated. The test results may include example screenshots of the client company applications and/or example reports generated by the channel implementation processor 250 (possibly in conjunction with the PRM application 140), etc. To notify the host company business departments, the channel implementation processor 250 (possibly in conjunction with the PRM application 140) may be configured to automatically send an electronic message, such as an email message, an instant message, etc., to some or all or the computers 150-156 associated with some or all of the host company business departments to indicate that the test results are ready to be evaluated. Alternatively or additionally, the channel implementation processor 250 (possibly in conjunction with the PRM application 140) may be configured to automatically send a voice message, such as a voicemail or automated phone call, to an appropriate contact person in some or all of the host company business departments to initiate the evaluation of the test results. Control then proceeds to block 970 at which the appropriate host company business department or departments evaluate the test results to determine whether they meet meets predetermined qualifications required by the host company 120. For example, such qualifications may include whether host company information is displayed properly by the client company application to meet legal or other requirements, whether the security provided by the client company application is sufficient, whether all contract terms have been met, etc. Alternatively, the host company 120 may set no predetermined qualifications and, thus, automatically accept any test results provided by the client company 110 or not require that test results be provided by the client company 110.

After the host company business department or departments complete their respective evaluations at block 970, control proceeds to block 980 at which the channel implementation processor 250 (possibly in conjunction with the PRM application 140) monitors for evaluation indicators to be returned by the host company business departments. The evaluation indicators may indicate, for example, that the test results have been approved or have been disapproved based on a provided list of deficiencies. To send these indicators, in one example, the computers 150-156 associated with the some or all of the host company business departments which evaluated the test results may be used to send an electronic message, such as an email message, an instant message, etc., to the partner acquisition processor 230 and/or PRM application 140. Alternatively or additionally, in another example, appropriate contact personnel in some or all of the host company business departments may call a voice menu system (e.g., an interactive voice response unit) interfaced to the partner acquisition processor 230 and/or PRM application 140 to enter the appropriate evaluation indicators corresponding to their respective evaluations. After receipt of all of the evaluation indicators, the partner acquisition processor 230 compiles the results of the evaluation.

If the evaluation indicators indicate that all of the test criteria have been met and, thus, that all appropriate business departments have responded with approval (block 990), the example distribution channel development and verification process 650 then ends. If, however, the evaluation indicators indicate that all of the criteria have not been met and, thus, that all appropriate business departments have not responded with approval (block 990), control then returns to block 940 and blocks subsequent thereto at which the client company revises its applications to correct the deficiencies in the test results.

Figure 10:
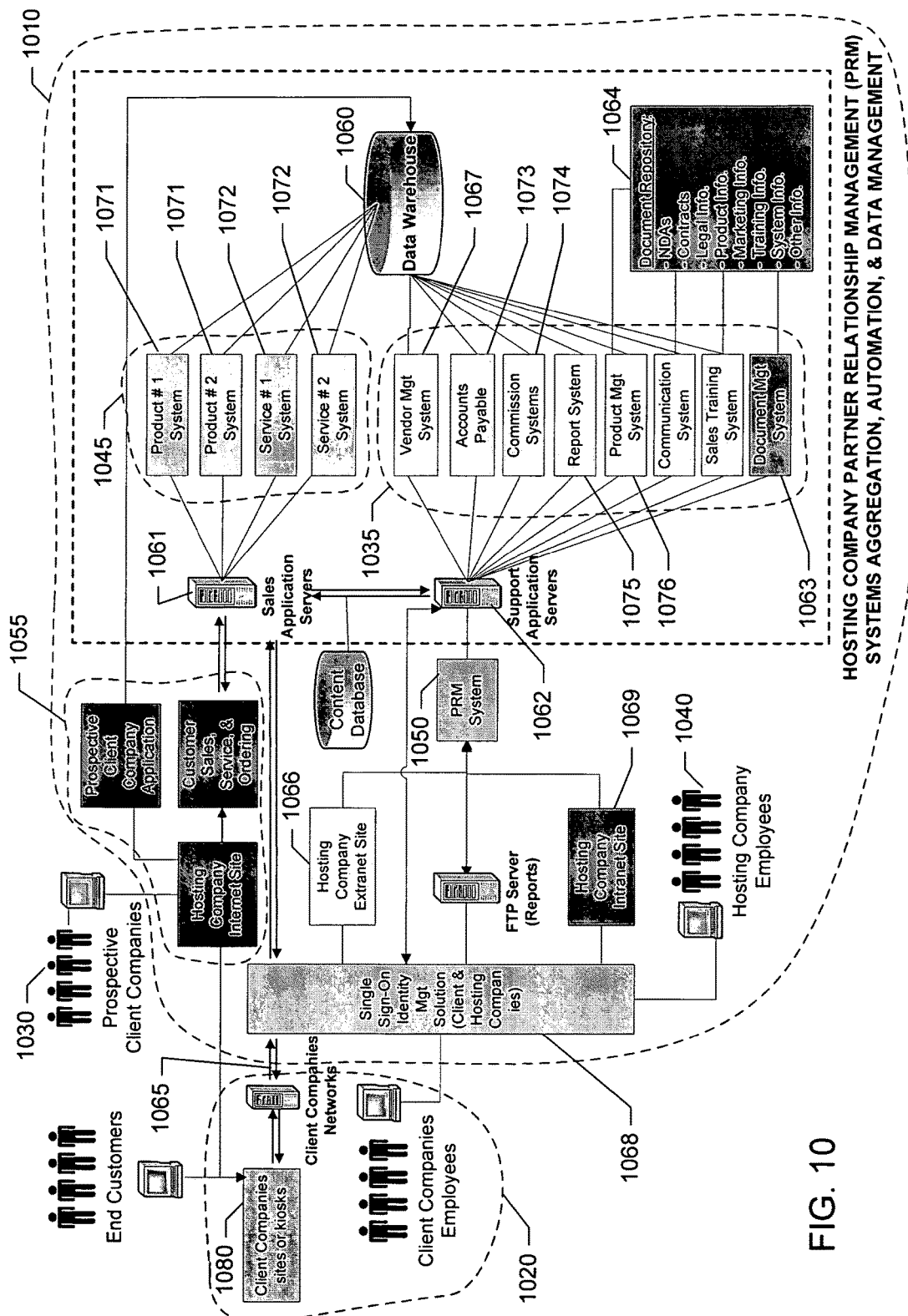
FIG. 10 is a block diagram of a second example environment of use that supports automatic distribution channel activation.

Another example environment of use 1000 which may employ the techniques disclosed herein for activating, for instance, a distribution channel is shown in FIG. 10. The example environment 1000 includes a host company 1010 and one or more client companies 1020 and one or more prospective client companies 1030. The host company 1010 further includes one or more business department systems 1035 accessible by one or more business departments and/or personnel 1040 involved in activating a distribution channel to be provided by a client company 1020. The distribution channel enables the client company 1020 to, for example, distribute and/or purchase products and/or services provided by the product and service systems 1045. The host company 1010 also includes a PRM application 1050 configured to implement any known PRM functionality as discussed above. Additionally, the PRM application 1050 is configured to enable automatic distribution channel activation based on the techniques disclosed herein.

As discussed previously, a prospective client company 1030 may access a user interface 1055 to complete, for example, an electronic (e.g., online) application and/or an electronic NDA to make an offer to provide a distribution channel for the host company 1010. The PRM application 1050 receives the information provided by the prospective client company 1030 and may also store this information in a data warehouse 1060. The PRM application 1050 then triggers the one or more host company business departments 1040 to evaluate the information to approve or disapprove the prospective distribution channel to be provided by the prospective client company 1030.

For example, upon receipt of the online application via a sales application server 1061 and a support application server 1062 as shown, the PRM application 1050 notifies via e-mail the employees in the various host company business departments and/or personnel 1040 to review the new prospective client company 1030. The host company business departments and/or personnel 1040 then access and review the online application via the intranet 1069 to approve or reject the prospective client company 1030. The PRM application 1050 then provides status via e-mail to the prospective client company 1030. If the prospective client company 1030 had been approved, the status e-mail may include a hyperlink to an electronic NDA. A resource manager at the host company 1010 may then assign the approved prospective client company 1030 to an account manager and the PRM application 1050 may notify the account manager via e-mail with his or her new assignment. Next, the hosting company account manager verifies the signature and acceptance of the electronic NDA and the PRM 1050 invokes a document management system 1063 via the support application server 1062 to store the NDA in the document repository 1064. Finally, the PRM application 1050 publishes the date the NDA was signed and approved as a milestone in an on-boarding status report.

If the prospective distribution channel is approved, the prospective client company 1030 becomes a client company 1020. The PRM application 1050 then enables configuration of the distribution channel parameters and establishing of a secure communication interface 1065 between the host company 1010 and the client company 1020. Next, the host company 1010 may provide the client company 1020 with access to development tools and/or documentation stored, for example, in the data warehouse 1060 and document repository 1064 to assist the client company 1020 with development of distribution channel interfaces/applications.

For example, after the prospective client company 1030 is approved and becomes a client company 1020, the hosting company account manager authorizes via the PRM application 1050 that employees of the client company 1020 may have access to the hosting company extranet 1066. The vendor management system 1067 is then invoked by the PRM application 1050 via the support application server 1062 to establish, update, and/or delete client company extranet users within the single sign-on identity management system 1068. The PRM application 1050 then provides extranet user name and passwords to employees of the client company 1020 via e-mail. Once this level of access is established, the host company 1010 and the client company 1020 may collaborate using the extranet 1066 and the intranet 1069 to input documents, terms, agreements, etc. to establish their business relationship. For example, the document management system 1063 may be invoked by the PRM application 1050 to store business relationship agreements, plans, etc. in the document repository 1064. Furthermore, the vendor management system 1067, the product systems 1071, the service systems 1072, accounts payable 1073, the commission system 1074; the report system 1075, and the product management system 1076 may also be invoked by the PRM application 1050 via the support application server 1062 to establish, update, and/or delete client company information based on the contracts/agreements relevant to the business relationship. Additionally, the PRM application 1050 can distribute appropriate product and/or service system usage and/or access information to employees of the client company 1020 via the extranet 1066. Finally, the client company employees may use product and/or service system support tools available via the extranet site 1066 to automate business-to-business system integration.

Using the tools provided by the host company 1010, the client company 1020 may then develop distribution channel applications to interface with an existing user interface 1080 operating at the client company 1020. After the client company 1020 completes development of its distribution channel applications, the PRM application 1050 may be used to facilitate evaluation of test results by the host company business departments 1040 as discussed above. If the host company business departments 1040 approve the test results, the PRM application 1050 may be used to communicate such approval to the client company 1020 and activate the distribution channel.

For example, the vendor management system 1067, product systems 1071 and/or service systems 1072 may be invoked by the PRM application 1050 via the support application server 1062 and sales application server 1061 to certify that the client company 1020 is able to properly use the automated business-to-business system developed using the product and/or service system support tools. After all product and/or service system launch readiness criteria have been completed, the PRM application 1050 notifies the client company 1020 via e-mail that the automated business-to-business product and/or service system is launch ready. The host company account manager then approves the client company product and/or service system launch via the intranet 1069. The PRM application 1050 then invokes the vendor management system 1067, the product systems 1071 and/or the service systems 1072 to launch the distribution channel associated with the client company 1020. Finally, the PRM application notifies all interested parties via e-mail that the distribution channel associated with the client company 1020 has launched.

Figure 11:
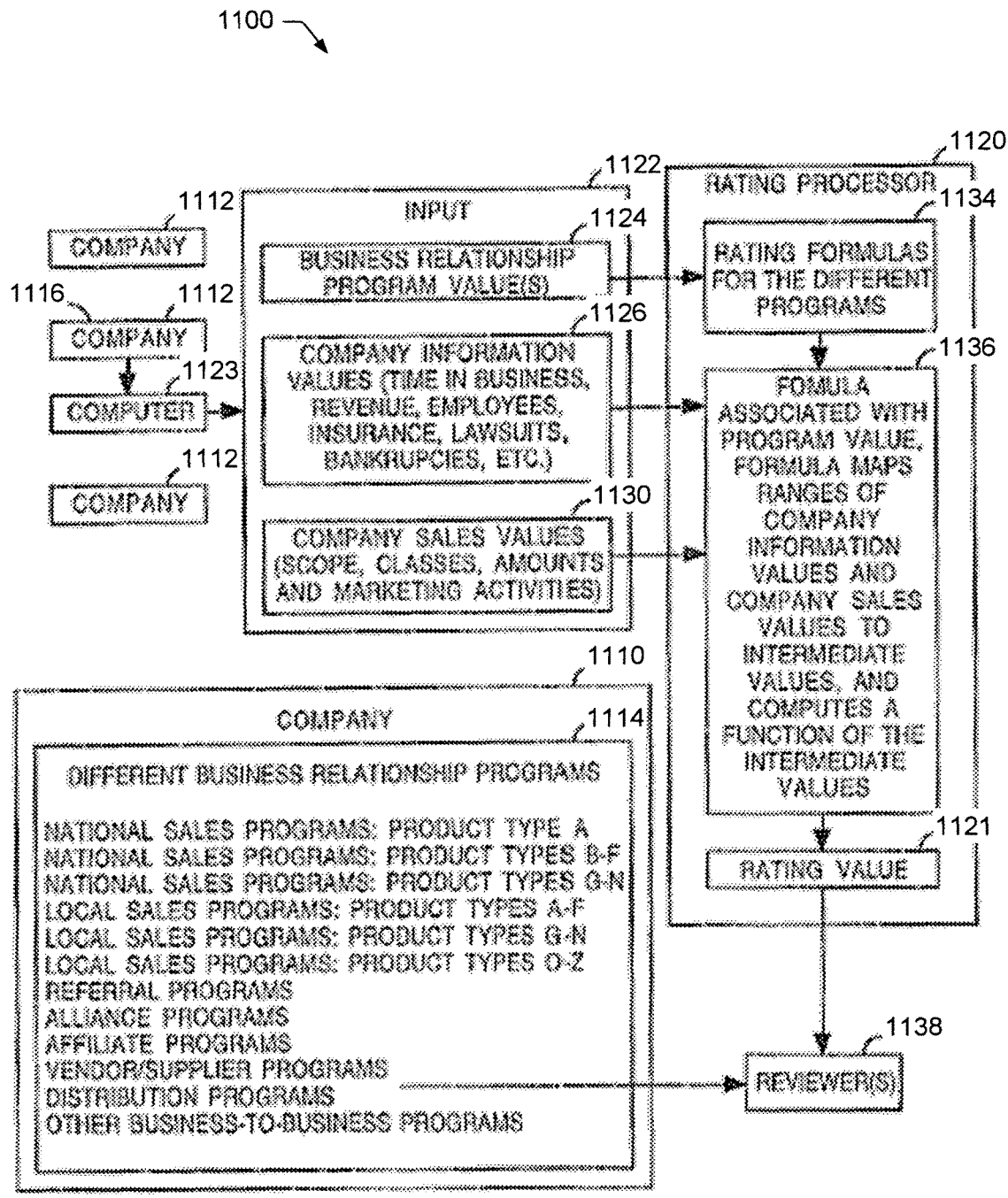
FIG. 11 is a block diagram of a client company evaluation system that may be used to implement at least portions of the example partner acquisition processor of FIG. 3 and/or the example partner acquisition process or FIG. 7.
Figure 12:
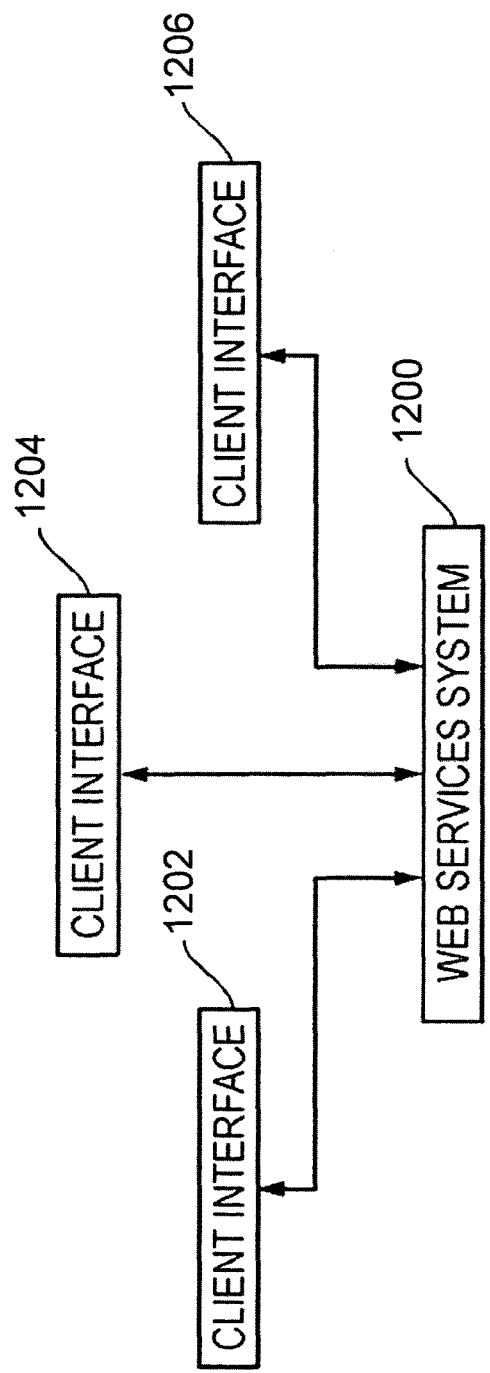
FIG. 12 illustrates example distribution channel applications/interfaces to be developed and verified by the example channel implementation processor of FIG. 5 and/or the example channel development and verification process of FIG. 9.

A block diagram of an example client company evaluation system 1100 that may be used to implement at least portions of the example partner acquisition processor 230 of FIG. 3 and/or the example partner acquisition process 610 of FIG. 7 is shown in FIG. 11. The example of FIG. 11 and the corresponding description included herein is based on the disclosure provided in U.S. patent application Ser. No. 11/297,895, entitled "Dynamic Electronic Rating and Ranking System," which is hereby incorporated by reference in its entirety. The example evaluation system 1100 implements an electronic rating tool that dynamically calculates rating values for companies (e.g., such as the client company 110 of FIG. 1) who wish to apply to any of a plurality of different business relationship programs. The rating value, which may be in the form of a priority score and/or a ranking, for each company is based on which of a plurality of different business relationship programs that the company has applied to join. Examples of the business relationship programs include, but are not limited to, one or more sales programs, one or more supplier programs, one or more distributor programs, one or more alliance programs, one or more affiliate programs, and one or more referral programs. The tool manages a different set of scoring criteria and values for each business relationship program.

Automating the initial evaluation process in this manner saves time and money by eliminating those applicants that are deemed not to qualify and prioritizing the remaining applicants. The tool can be extended to multiple internal and/or external corporate systems to use in multiple departments to support all business-to-business programs. The tool can be customized to establish unique, program-specific business rules, criteria and scoring. The tool can be implemented as a Web service computer system.

Turning to FIG. 11, the example evaluation system 1100 is configured to enable a host company 1110 (e.g., such as the host company 120 of FIG. 1) to rate client companies 1112 (e.g., such as the client company 110 of FIG. 1). The client companies 1112 wish to have a business relationship with the host company 1110 via one or more of a plurality of different business relationship programs 1114 provided by the host company 1110. The different business relationship programs 1114 may include one or more national business relationship programs and one or more local business relationship programs. The local business relationship programs are commonly divided by state, city, region or market territory. The national business relationship programs may comprise any combination of a national retail program, a national dealer program and a national distributor program. The local business relationship programs may comprise different regional authorized sales programs, each for a different region (e.g. east, midwest, southwest and west).

Examples of the different business relationship programs 1114 include, but are not limited to, national sales programs, local sales programs, affiliate programs, referral programs, alliance programs, vendor programs, supplier programs, distributor programs and business-to-business programs. The supplier, vendor and distribution programs may be segmented by region, product type(s), service type(s), material type(s), quality grades, or other criteria. Specific examples of the different business relationship programs 1114 include, but are not limited to, a national retail program, a national dealer program, a national distributor program, a value-added reseller program, a premium Web partner program, an affiliate Web partner program, a partner referral program, an alliance partner program, an authorized sales agents program, an authorized distributor program, an enterprise solution provider program, and authorized sales representative programs.

The evaluation system 1100 comprises a rating processor 1120 that calculates or otherwise determines rating values 1121 for the client companies 1112. Although any number of client companies 1112 may be rated using the evaluation system 1100, the following description is made with reference to rating an example client company 1116.

The rating processor 1120 determines a rating value 1121 for the client company 1116 based on received input 1122 associated with the client company 1116. The received input 1122 comprises a program value 1124, company information values 1126 and company sales values 1130 for the client company 1116 to be rated.

The input 1122 may be received via an online, electronic application form to apply for a business relationship with the host company 1110. The form may be accessible via a Web site of the host company 1110 or via internally-supported computer software through, for example, the user interface 210 of FIG. 2. The PRM Web site may provide other PRM tools offered, for example, by the PRM application 140 of FIG. 2. The input 1122 may be entered by a member of the client company 1116 using a computer 1123.

The program value 1124 indicates which of the different business relationship programs 1114 that the client company 1116 has applied. In general, each of the client companies 1112 may apply for one or more of the different business relationship programs 1114.

The company information values 1126 indicate general information about the client company 1116 to be rated. Examples of the company information values 1126 include, but are not limited to, an amount of time in business (e.g., a number of years in business), an annual revenue (e.g. measured in dollars or another currency), a number of employees, an amount of liability insurance (e.g., measured in dollars or another currency), a lawsuit indication (e.g., yes or no), a bankruptcy filing indication (e.g., yes or no), a number of service types offered (e.g., business consulting, technology consulting, hardware/software installation, etc.), a number of material types sold (e.g., steel, iron, rubber, wood, plastic, glass, etc.), and a quality grade (e.g., an industry quality rating, a capability maturity model level, an ISO standard, etc.).

The company sales values 1130 indicate a scope of sales, classes of sales, amounts of sales, and marketing activities for the client company 1116 to be rated. As used herein, sales may be indicative of actual sales and/or projected sales.

The scope of sales may be represented by a value that indicates how many states, provinces, countries, or other geographical regions in which the client company 1116 has sales. The classes of sales may be represented by one or more values that indicate whether the client company 1116 has business sales, residential sales or both. The amount of sales indicates an amount of sales either in units, customers, dollars or another currency. The marketing activities may be represented by a value that indicates a number of marketing activities for the client company 1116. The marketing activities may be based on a business plan and/or distribution capabilities of the client company 1116.

Examples of amount-of-sales values include, but are not limited to, a first value indicating an amount of voice telephony sales, a second value indicating an amount of wireless telephony sales, a third value indicating an amount of Internet service provider (ISP) sales (e.g. an amount of digital subscriber line sales or dial-up service sales), a fourth value indicating an amount of wireless Internet access sales, a fifth value indicating an amount of video services sales, a sixth value indicating an amount of managed services solutions sales (e.g. SBC PremierSERVSM services), a seventh value indicating an amount of Web hosting sales, an eighth value indicating an amount of teleconferencing sales (e.g. audio/video/Web conferencing sales), a ninth value indicating an amount of directory sales (e.g. White Pages and Yellow Pages sales), and a tenth value indicating an amount of equipment sales (e.g. voice or video equipment sales). Any number of different product types can be represented by amount-of-sales values.

Optionally, if a state or region is selected outside a territory served by the host company 1110, another program (e.g. a national program) may need to be selected before submitting the application. The need to select another program is enforced by one or more business rules defined by the host company 1110.

The rating processor 1120 can determine the rating value 1121 for the client company 1116 based on the program value 1124, the company information values 1126 and the company sales values 1130 in a variety of ways. For example, the rating processor 1120 associates potentially different rating formulas 1134 with the different business relationship programs 1114. The rating processor 1120 processes the company information values 1126 and the company sales values 1130 using a particular rating formula 1136 associated with the program value 1124.

Each rating formula may map ranges of company information values 1126 and company sales values 1130 to intermediate values. Each of the ranges may be defined by a corresponding start range and/or a corresponding end range. Each rating formula assigns a corresponding score value to each of the ranges. If an input value is within a particular range defined by the formula, the score value that the formula has assigned to the particular range is used as an intermediate value.

The intermediate values for all of the input values are processed to determine the rating score. The intermediate values may be summed (either weighted or unweighted), averaged, or computed using another function to determine the overall rating score. In an example, the intermediate values represent points that are summed to obtain an overall rating score, where higher point values are indicative of a better rating score.

An example of a mapping of the amount of time in business to an intermediate value is as follows. If the company has been in business for less than 2 years, the intermediate value is 0. If the company has been in business for 3 to 5 years, the intermediate value is 2. If the company has been in business for 6 to 10 years, the intermediate value is 4. If the company has been in business for over 10 years, the intermediate value is 5.

An example of a mapping of the annual revenue to an intermediate value is as follows. If the company has an annual revenue of less than $1 million, the intermediate value is 1. If the company has an annual revenue of between $1 million to $100 million, the intermediate value is 2. If the company has an annual revenue of between $101 million to $500 million, the intermediate value is 4. If the company has an annual revenue of $501 million or greater, the intermediate value is 5.

An example of a mapping of the number of employees to an intermediate value is as follows. If the company has 25 or less employees, the intermediate value is 0. If the company has between 26 and 100 employees, the intermediate value is 2. If the company has between 101 and 300 employees, the intermediate value is 3. If the company has 301 or more employees, the intermediate value is 4.

An example of a mapping of the amount of liability insurance to an intermediate value is as follows. If the company has $500 k or less in liability insurance, the intermediate value is 0. If the company has between $501 k and $1000 k in liability insurance, the intermediate value is 2. If the company has between $1001 k and $3000 k in liability insurance, the intermediate value is 3. If the company has $3001 k or more in liability insurance, the intermediate value is 3.

An example of a mapping of the lawsuit indication to an intermediate value is as follows. If the company is involved in any lawsuits, the intermediate value is −20. If the company is not involved in any lawsuits, the intermediate value is 0.

An example of a mapping of the bankruptcy filing indication to an intermediate value is as follows. If the company has any bankruptcy filings, the intermediate value is −25. If the company does not have any bankruptcy filings, the intermediate value is 0.

An example of a mapping of the scope of sales to an intermediate value is as follows. If the company has sales in 1 state, the intermediate value is 1. If the company has sales in 2 to 4 states, the intermediate value is 2. If the company has sales in 5 to 8 states, the intermediate value is 3. If the company has sales in 9 or more states, the intermediate value is 4.

An example of a mapping from a services value to an intermediate value is as follows. If the company offers only business services, the intermediate value is 2. If the company offers only residential services, the intermediate value is 3. If the company offers both residential and business services, the intermediate value is 4.

An example mapping of the amount-of-sales values to an intermediate value is as follows. If the amount-of-sales value is less than 25, the intermediate value is 5. If the amount-of-sales value is from 26 to 50, the intermediate value is 7. If the amount-of-sales value is from 51 to 75, the intermediate value is 10. If the amount-of-sales value is from 76 to 100, the intermediate value is 12. If the amount-of-sales value is from 101 to 500, the intermediate value is 15. If the amount-of-sales value is from 501 to 1000, the intermediate value is 20. If the amount-of-sales value is more than 1000, the intermediate value is 25.

An example of a mapping from a number-of-marketing-activities value to an intermediate value is as follows. If the company has no marketing activities, the intermediate value is 0. If the company has 1 marketing activity, the intermediate value is 1. If the company has from 2 to 4 marketing activities, the intermediate value is 2. If the company has from 5 to 8 marketing activities, the intermediate value is 4. If the company has 9 or more marketing activities, the intermediate value is 5.

Some business relationship programs may sum all of the above intermediate values, using a single point value for each input value, to determine the rating value. For example, a national retail program, a national distributor program, a premium Web partner program, a partner referral program, an alliance partner program and a national authorized sales agents program may use all of the above intermediate values, though each may have its own unique mappings.

Other business relationship programs may sum fewer than all of the above intermediate values to determine the rating value. For example, a national dealer program and a value-added reseller program may exclude an intermediate value for the class of services. As another example, a regional authorized distributor program, a regional enterprise solution provider program and a regional authorized sales representative program may exclude intermediate values for the class of service and the number of states.

In general, any of the national sales programs, local sales programs, distributor programs, referral programs, alliance programs, and vendor programs can have its own unique mapping and can use either all or fewer than all of the intermediate values to determine the rating value.

The affiliate Web partner program may be excluded from using the online application, and thus may not use any of the above intermediate values as described above. Companies applying for the affiliate Web partner program may be redirected to another Web site for completing a separate online application managed by another department.

The rating processor 1120 outputs the rating value 1121 for the client company 1116 (and optionally rating values for other applicants) in either a hard copy (e.g. using a printer) or a soft copy (e.g. using a display device) format. The rating processor 1120 can sort the applicants, from best-to-worst, based on their rating values. The applicants can be sorted within each business relationship program. By sorting or otherwise prioritizing the applicants based on their rating values, better applicants can be approved for the business relationship programs, which can lead to increased profitability by decreasing recurring business-to-business manual evaluation costs and increasing overall revenue for the company.

The rating values for applicants of a business relationship program can be outputted to one or more reviewers 1138 in, for example, one or more business departments of the host company 1110 via, for example, the PRM application 140 and/or the communication interface 260 of FIG. 2. The reviewer(s) 1138 may comprise one or more consumer prospect reviewers and/or one or more business prospect reviewers who determine whether or not to approve program applications. Each business relationship program may have its own set of one or more reviewers. Names and contact information (e.g. e-mail addresses or phone numbers) of the reviewers for a business relationship program may be stored in a database.

The reviewers or a program manager assigned to a business relationship program may have the authority to modify parameters of its rating formula. The rating processor 1120 can receive, as an input, modified parameter values from a reviewer or a program manager of a particular business relationship program via, for example, the communication interface 260 of FIG. 2. The rating processor 1120 stores and uses the modified parameter values when subsequently determining rating values for the particular business relationship program. In this way, the rating formulas can evolve over time. Further, each rating formula can better reflect the importance of each of the input values to its particular business relationship program. Still further, different formulas can be used for the same type of business relationship program but for different regions.

Another dynamic aspect is that each of a plurality of sales programs can have a respective combination of product types that is dynamically defined by the host company 1110. As product mixes change over time, any combination of the particular inputs required from applicants, the rating formulas and/or the rating values can change accordingly. In general, the product types reflected in the company sales values 1130 can be dynamically added, deleted, changed and/or expanded to any number to support marketing objectives of the host company 1110.

Yet another dynamic aspect of the calculation of the rating values is that if the company information values and the company sales values are updated, an updated rating value is determined for the applicant immediately after the updates are made by a user.

If a company applies for multiple programs on a single application, the rating processor 1120 may determine multiple rating values for the multiple programs, and average the multiple rating values. For example, the client company 1116 may apply for both a first business relationship program and a second business relationship program. In this case, the rating processor 1120 determines: a first rating value based on a first program value, the company information values and the company sales values; and a second rating value based on a second program value, the company information values and the company sales values. The first program value identifies the first program's business rules, start and end ranges, direct criteria and individual scores to assign for each range of input value. These values are used to process the company information values and the company sales values to determine the first rating value. The second program value identifies the second program's business rules, start and end ranges, direct criteria and individual scores to assign for each range of input value. These values are used to process the company information values and the company sales values to determine the second rating value.

An example Web services development tool kit and example processes and procedures for developing and testing a client's distribution channel interface, any or all of which may be used, for example, in the example channel development and verification process 650 of FIG. 9, are shown in FIGS. 12-18. The examples of FIGS. 12-18 and the corresponding description included herein is based on the disclosure provided in U.S. patent application Ser. No. 11/297,800, entitled "Web Services Development Automation Toolkit with Test Case Driver and Customized Configuration File," which is hereby incorporated by reference in its entirety. The Web services development tool kit may be provided by a host company (e.g., such as the host company 120 of FIG. 1) to a client company (e.g., such as the client company 110 of FIG. 1) to enable the client company to develop its interface to the distribution channel being activated. The Web services development tool kit includes Web services development tools, one or more of which may be customized for a particular company that is to develop a client interface to Web services used to implement the distribution channel.

The Web services development tools provide a common development programming language framework to streamline and automate activities required to use a Web services interface such as a Simple Object Access Protocol (SOAP) Web services interface. The Web services development automation tools provide a suite of development utilities, executables, configuration files, SOAP clients, test data for internal or external company users of a single or multiple Application Program Interface (API) transaction services, and optionally other ready-to-use computer program code. By using the development tools, internal and external business-to-business (B2B) users of a Web services system 1200 shown in FIG. 12 can save time and expenses for initial set-up and ongoing maintenance of their client interfaces 1202, 1204 and 1206 versus a typical manual method of interpreting published development specifications. The tool kit may be generated and provided by the host company 120 to enable others to sell the company's products and services using the company's Web services system 1200. The client interfaces 1202, 1204 and 1206 may be created by other companies to sell the products and services using the Web services system 1200.

Figure 13:
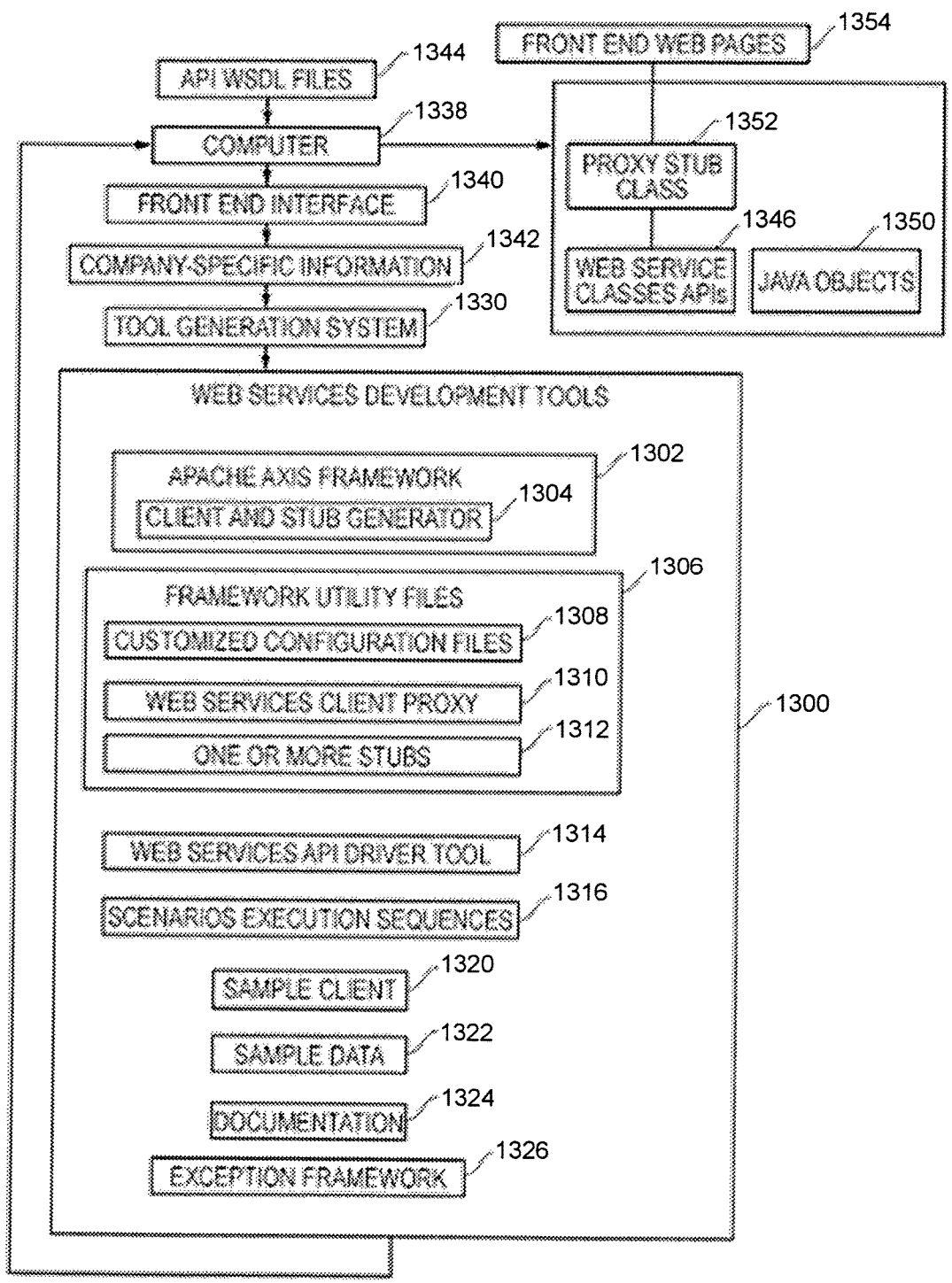
FIG. 13 illustrates example development tools that may be provided by a host company to a client company to develop and/or test the distribution channel applications/interfaces of FIG. 12.

FIG. 13 is a block diagram of example Web services development tools 1300 to assist in developing the client interfaces 1202, 1204 and 1206. The example Web services development tools 1300 include: an Apache Axis framework 1302 or another SOAP-based framework that includes a client and stub generator 1304. Further, the Web services development tools 1300 include one or more framework utility files 1306 that include one or more customized configuration files 1308, a Web services client proxy 1310, and one or more stubs 1312. As shown, the Web services development tools 1300 can include a Web services API driver 1314 (also referred to as a test case driver) and one or more scenario execution sequences 1316. Also, the Web services development tools 1300 can include a sample client 1320, sample data 1322, documentation 1324, and an exception framework 1326. Use of these items can, for example, reduce or eliminate many recurring coding and unit testing tasks of a developer of a client interface.

An example tool generation system 1330 can customize one or more of the Web services development tools 1300 to each client company 110 that is to have a client interface that accesses the Web services system 1200. For example, the tool generation system 1330 can generate and provide a first configuration file specific to a first company/developer, and a second configuration file specific to a second company/developer, where the first configuration file differs from the second configuration file. As another example, the tool generation system 1330 can generate different scenario execution sequences for different developers/companies.

Further, the tool generation system 1330 can modify or otherwise refresh the Web services development tools 1300 over time for each company/developer. The Web services development tools 1300 can be refreshed based on updated product and service information for the client company 110.

After the various components have been generated, the tool generation system 1330 can aggregate and/or compress either some or all of the Web services development tools 1300 into one or more files such as ZIP file(s). For example, the Web services development tools 1300 may be embodied as a kit that is accessible by selecting one or more links at a Web site.

Figure 14:
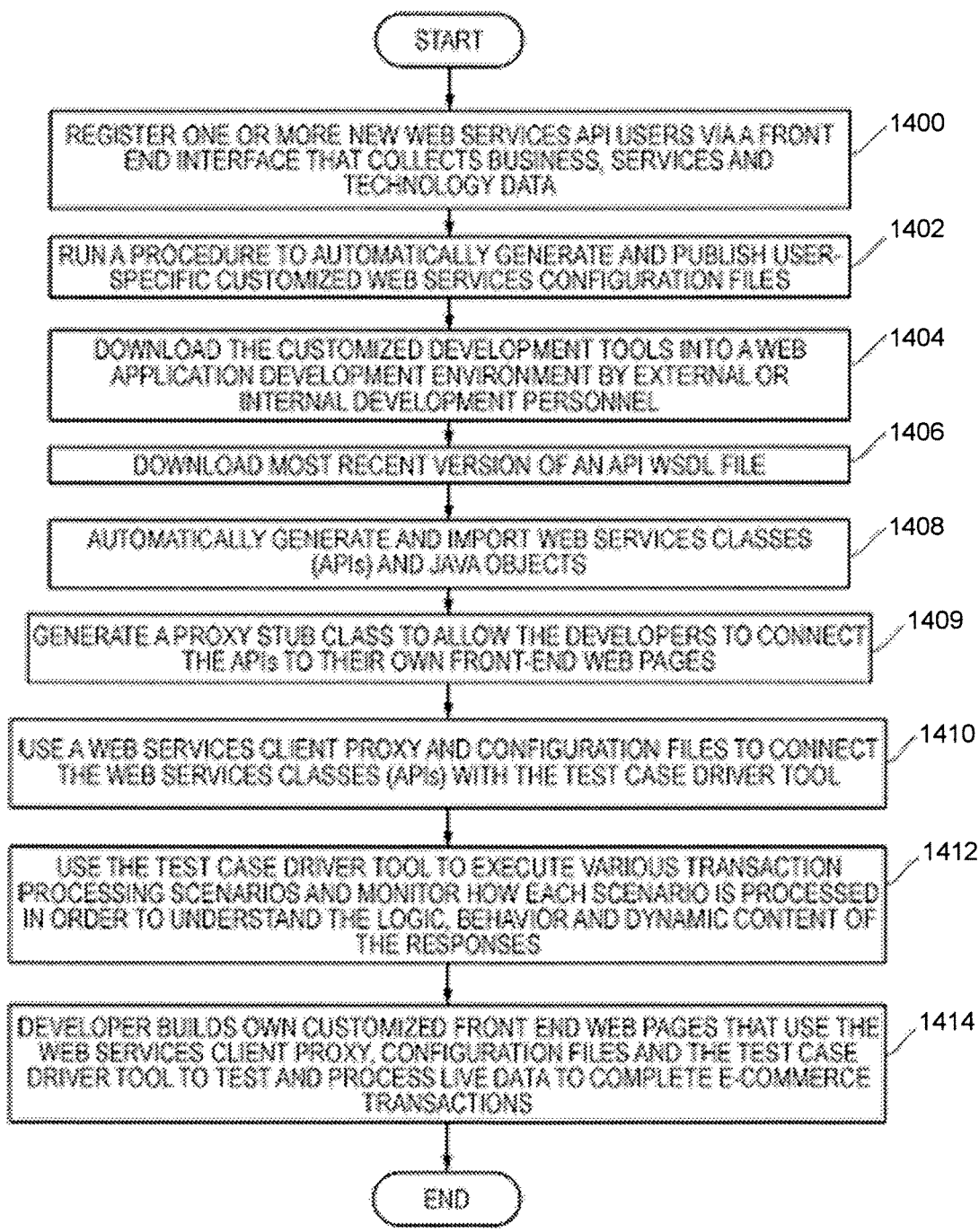
FIG. 14 is a flowchart representative of an example application development process that may be used to develop and/or test the example distribution channel applications/interfaces of FIG. 12 using the example development tools of FIG. 13.

FIG. 14 is a flow chart of an example process of using the Web services development tools 1300. Although described with reference to a single client company 110 and its software developer, the method is usable for customizing the Web services development tools 1300 for each of a plurality of companies and developers. For ease of discussion, acts described with reference to FIG. 14 also make reference to elements of FIG. 13.

Commencing at block 1400, a Web services API developer is registered via a front-end interface 1340, such as the user interface 210 of FIG. 2, using a computer 1338, such as one of the computers 170-172 of FIG. 1. The front-end interface 1340 collects company-specific information 1342 such as business, services, and technology data. The information can be received from the computer 1338 or other sources. The developer may comprise either external or internal development personnel.

Proceeding to block 1402, the tool generation system 1330 runs a stored procedure to automatically generate and publish the one or more company-specific customized Web services configuration files 1308 based on the company-specific information 1342. Examples of the program code features of the configuration files 1308 that can be customized include, but are not limited to, user names and passwords, service listings, promotion codes, and Web services endpoints. The configuration files 1308 drive configurable runtime inputs such as a default key store directory path, a key store password, and an endpoint Uniform Resource Locator (URL) of services. The scenarios execution sequences 1316 also can be generated specific to the company, e.g. based on which products and services the company is to offer.

As indicated by block 1404, the developer downloads the Web services development tools 1300 that were customized for the company to the computer 1338, for example, via the communication interface 260 of FIG. 2. The customized Web services development tools 1300 can be downloaded into a Web application development environment for the developer. Examples of the Web application development environment include a Websphere Application Development (WSAD) project or another project.

Moving to block 1406, the developer downloads a most current version of one or more API Web Services Description Language (WSDL) file(s) 1344 to the computer 1338, for example, via the communication interface 260 of FIG. 2. At block 1408, the developer uses a SOAP framework such as the Apache Axis framework 1302 and the framework utility files 1306 with the WSDL file(s) 1344 to automatically generate and import one or more Web services classes (APIs) 1346 and Java objects 1350 using the computer 1338.

A proxy stub class 1352, which allows the developer to connect the APIs 1346 to its own front-end Web pages 1354, is also generated using the computer 1338 as indicated by block 1409. The proxy stub class 1352 mitigates a burden of communicating with Web services at a SOAP level and allows external partners to invoke Web services methods in any development environment that supports SOAP and Web service proxies.

Further, at block 1410, the developer uses the Web services client proxy 1310 and the configuration files 1308 to connect the Web services classes (APIs) 1346 with the Web services API driver 1314. If a public key identifier (PKI) digital ID (e.g. a client certificate) is required to access the Web services API, then the developer should have installed a signed PKI and private key into its key store using a Java keytool or similar tool. The act indicated by block 1410 may include installing or validating that the testing configuration file is mapped to the client proxy 1310, and executing the Web services API driver 1314 to confirm that the PKI and test configuration files were installed properly.

Moving to block 1412, the developer uses the Web services API driver 1314 to execute various transaction processing scenarios and monitor how each scenario is processed in order to understand the logic, behavior, and dynamic content of the responses. At block 1414, the developer builds one or more customized front-end Web pages that use the Web services client proxy 1310, the configuration files 1308 and the Web services API driver 1314 to test and process live data to complete e-commerce transactions.

Figure 15:
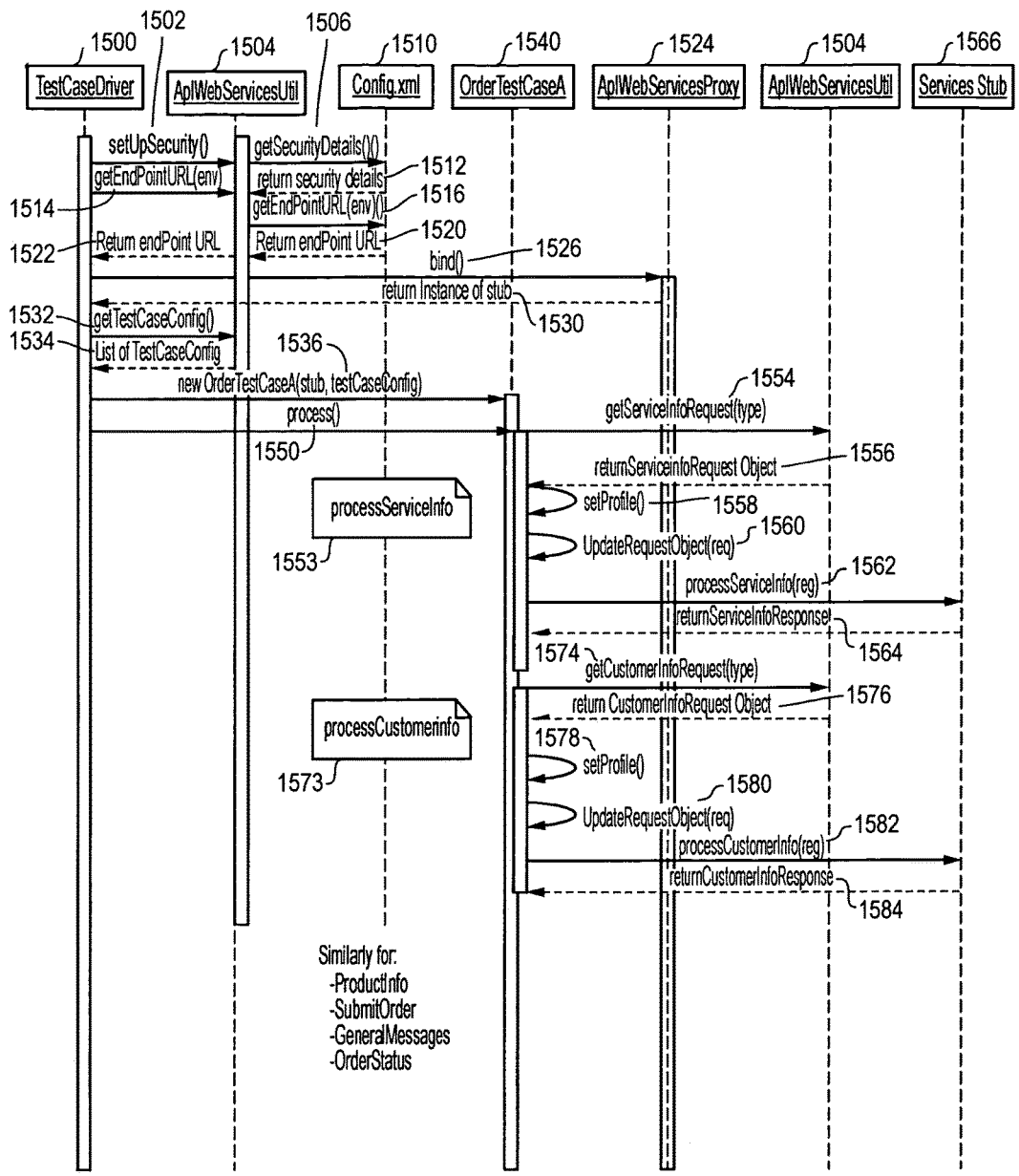
FIG. 15 illustrates an example procedure for testing a distribution channel application/interface that may be used to implement at least portions of the example channel implementation processor of FIG. 5 and/or the example channel development and verification process of FIG. 9.

FIG. 15 is a flow diagram of an example testing procedure using the Web services API driver 1314 to execute various transaction processing scenarios. The example testing procedure of FIG. 15 may be used to conduct, for example, at least portions of the testing of the distribution channel interface performed at block 950 of FIG. 9. The Web services API driver 1314 comprises a test case driver 1500 (e.g. TestCaseDriver.java). The test case driver 1500 is a main driver class which uses helper classes, and instantiates and executes configured test case classes.

At step 1502, the test case driver 1500 invokes a set-up-security method (e.g. setUpSecurity( )) of a Web services utility 1504. At step 1506, the Web services utility 1504 reads a configuration file 1510 (e.g. config.xml) to get security details.

Figure 16A:
FIGS. 16A-16B illustrate an example configuration file for use in the example application development process of FIG. 14.
Figure 16B:
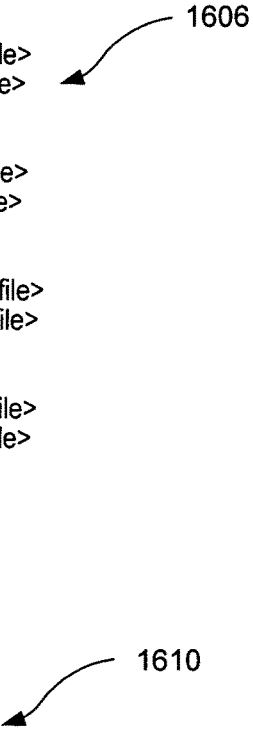

An example of the configuration file 1510 is shown in FIGS. 16A-16B. The configuration file comprises respective computer program code portions for each of certification credentials 1600, environment settings 1602, profile settings 1604, data file mappings 1606, and test case mappings 1610. Some or all of the respective computer program code portions are customized to the particular company/developer by the tool generation system 1330.

Referring back to FIG. 15, at step 1512, the security details from the configuration file 1510 are returned to the Web services utility 1504. The Web services utility 1504 parses the configuration file 1510 and retrieves a key store value (e.g. keyStore), a key store password value (e.g. keyStorePassword), a trust store value (e.g. trustStore), a trust store password value (e.g. trustStorePassword), and/or other security details. The Web services utility 1504 sets these values in class variables.

In an example, the set-up security method gets a WSSecurity object from the configuration file 1510, retrieves the values for keyStore, KeyStorePassword, trustStore, trustStorePassword and endPointURL therefrom, and sets system properties based on the values. An example of setting the system properties is as follows:

System.setProperty(KEYSTORE, WSSecurity.geKeyStore( )); //"javax.net.ssl.keyStore", "C:/_MyJavaKeystore/KS1");

System.setProperty(KEYSTORE_PASSWORD, WSSecurity.getKeyStorePassword( )); //"javax.net.ssl.keyStorePassword"

System.setProperty(TRUSTSTORE, WSSecurity.getTrustStore( )");

System.setProperty("javax.net.ssl.trustStorePassword", "kspassword"); //Use Sun's reference implementation of a URL handler for the "https" URL protocol type;

System.setProperty("java.protocol.handler.pkgs", "com.sun.net.ssl.inter nal.www.protocol");

System.setProperty("javax.net.debug", "ssl"); //all/ssl// Dynamically register SUN's ssl provider.java.security.Security.addProvider(new com.sun.net.ssl.internal.ssl.Provider( )).

At steps 1514 and 1516, the test case driver 1500 invokes an endpoint Uniform Resource Locator (URL) method (e.g. endPointUrl=WebServicesUtil.getEndPointURL(env)) to retrieve an endpoint URL address depending on a set environment. Moreover, at steps 1520 and 1522, the endpoint URL address is returned from the configuration file 1510 to the test case driver 1500 via the Web services utility 1504. In an example, the endpoint URL method returns the endpoint URL address as a string based on an endpoint URL map.

Although not illustrated, the test case driver 1500 can invoke a timeout method (e.g. timeout=WebServicesUtil.getTimeoutL(env)) to retrieve a timeout value for a given environment.

The test case driver 1500 invokes a Web service proxy method 1524 (e.g. WebServiceProxy proxy=new WebServiceProxy( )) to create an instance of a proxy class. The WebServiceProxy class abstracts Axis-related client proxy code that helps in binding to the API Web services. The stub is created during design time using the endpoint URL as an input to bind to a specific server. The Web service proxy method 1524 initializes a service locator.

Proceeding to step 1526, the test case driver 1500 invokes a method to bind a stub to the endpoint URL address (e.g. WebServicesGateway stub=proxy.bind(endPointUrl)). The bind( ) method can set the endpoint URL on a service locator, invoke a bind on the locator, set a timeout value and return a stub. An example of computer program code to invoke the bind is shown in FIG. 17. Briefly, the computer program code in FIG. 17 acts to attempt to set up a SOAP connection, throw an exception if the attempt is unsuccessful, and set a timeout if the connection is made. At step 1530, an instance of the stub is returned to the test case driver 1500.

Moving to step 1532, the test case driver 1500 invokes a method to retrieve all test case scenarios required to be run (e.g. testCaseConfigList=WebServicesUtil.getTestCases( )). At step 1534, a list of test case scenarios is returned to the test case driver 1500. The testCaseConfigList is determined by parsing the configuration file 1510.

Further, at step 1536, the test case driver 1500 iterates through the list of test case scenarios and instantiate each class. For example, consider the test case driver 1500 instantiating a first order test case 1540, which is a constructor method, based on a WebServicesGateway value and a testCaseConfig value.

A Java class for the test case is created (e.g. TestCase testcase=Class.forName(testCaseConfig.getTestCaseImpl( ))). The configuration is read for the class (e.g. testcase.setTestCaseConfig (testCaseConfig)). The text case is executed (e.g. testcase.process( )). The process internally calls the required methods. This method retrieves which profile to be used and which data file to be selected.

Continuing to step 1550, the test case driver 1500 invokes a process method (e.g. process( )). The process method, in turn, calls the various methods for one or more invoking Web service APIs via the Web service utility 1504. The process method causes retrieval of a Web service gateway bind stub from a test case configuration object, retrieval of a data file path for each of the methods and set in the class variables, and invocation of one or more methods in a particular sequence.

For example, the sequence of methods may comprise methods to process service information 1553 in the configuration file 1510. The methods to process the service information 1553 may comprise a get service information request method (step 1554) to which a service information request object is returned (step 1556) by the Web service utility 1504, a set profile method (step 1558), an update request object method (step 1560), and a process service information method (step 1562) to which a service information response is returned (step 1564) by a services stub 1566.

Furthermore, the sequence of methods may comprise, for example, methods to process customer information 1573 in the configuration file 1510. The methods to process the customer information 1573 may comprise a get customer information request method (step 1574) to which a customer information request object is returned (step 1576) by the Web service utility 1504, a set profile method (step 1578), an update request object method (step 1580), and a process customer information method (step 1582) to which a customer information response is returned (step 1584) by the services stub 1566.

Similar methods are invoked for product information, order submission, general messages, and order status sequences based on the configuration file 1510. The responses generated for each sequence are compared to their expected responses to validate the client interface. Specific examples of requests and expected responses that are used in the validation include, but are not limited to, a customer account information request and response, a product catalog request and response, a customer validation request and response, a service qualification request and response, a future availability request and response, a product details request and response, a product configuration request and response, an order status request and response, a service scheduling request and response, a validate order request and response, a process order request and response, and a process message request and response.

Each of the aforementioned get request methods (e.g. steps 1554 and 1574) can be implemented using a single get API request object method (e.g. getAPIRequestObj(type)). The type value is a string indicating the type of request to be made. The method is called from the main client program. The method returns an API request object after loading the data from a configuration file, which may be in an extensible markup language (XML). An example method performs acts of obtaining a path to the XML file for the given type of request object, reading sample data from the XML file from the path, using Java Architecture for XML Binding (JAXB) to bring together the data in a Java request object, populating the APIRequest object used by Axis from JAXB Java Objects, and returning the APIRequest object.

Either TCPTunnelGUI or UtilSnoop functionality can be mimicked for capturing raw XML requests and responses. UtilSnoop can be modified as required.

Figure 18:
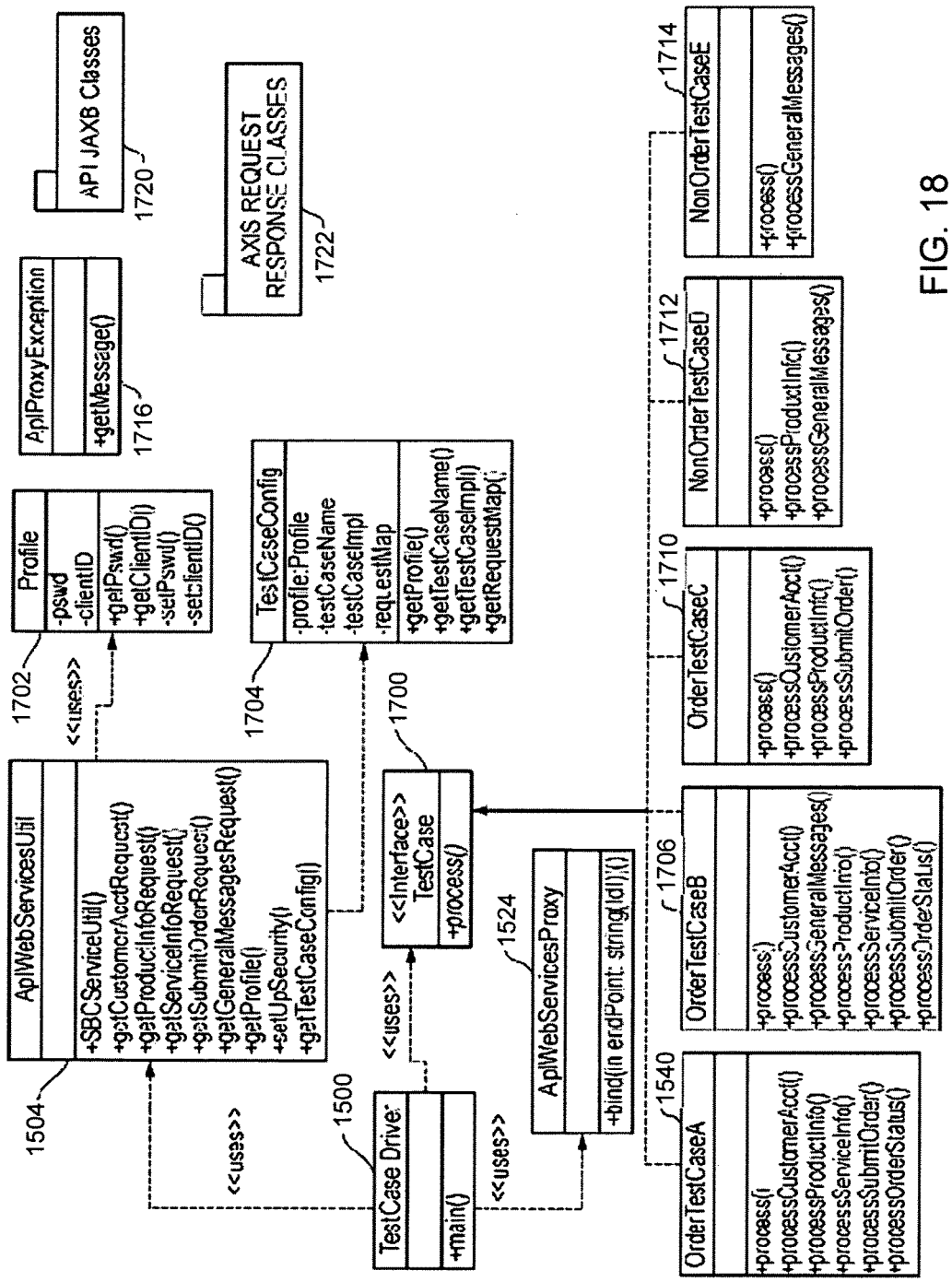
FIG. 18 is a block diagram illustrating various components used in testing distribution channel applications/interfaces based on the example procedure of FIG. 15.

FIG. 18 is a block diagram illustrating various components used in testing. The test case driver 1500 uses the Web services utility 1504, the Web services proxy 1524, and a test case interface 1700. The Web services utility 1504 uses a profile object 1702 to get and set a client identifier and a password. The Web services utility uses a test case configuration object 1704 to get a profile, get a test case name, get a test case implication, and get a request map.

For example, the test case interface 1700 provides ordering and non-ordering test cases. For purposes of illustration and example, the first ordering test cases comprise the order test case 1540, a second order test case 1706, and a third order test case 1710. The first order test case 1540 may be used, for example, to test a customer account feature, a product information feature, a service information feature, an order submission feature, and an order status feature. In addition to the aforementioned features, the second order test case 1706 may be used to test a general messages feature. Also, the third order test case 1710 may be used to test a customer account feature, a product information feature, and an order submission feature.

For purposes of illustration and example, the non-ordering test cases comprise two non-order test cases 1712 and 1714. The first non-order test case 1712 may be used, for example, to test a product information feature and a general messages feature. Moreover, the second non-order test case 1714 may be used to test a general messages feature.

An API proxy exception 1716 is part of the exception framework 1326 (FIG. 13). The exception framework 1326 (FIG. 13) comprises a base interface that custom exceptions are to implement. The base interface enforces standard implementations for retrieving information from an exception. A proxy layer catches all SOAP exceptions and builds a service extension. The service exception extends a base exception class and contains error information related to a specific API. The service exception encapsulates exceptions thrown by utility methods (e.g. set key store path, set endpoint URL and set key store password) before being sent to the client layer. The exception framework 1326 (FIG. 13) can provide the following hierarchy of exceptions: (1) service extensions containing a SOAP exception, (2) service exceptions containing a ROOT exception, and (3) other service exceptions.

API JAXB classes 1720 and Axis Request Response classes 1722 are separate packages that are referenced by elements in FIG. 18. The API JAXB classes 1720 are used to transform configuration files to Java objects. Axis is used to generate stub and client codes along with all necessary request and response objects for API transactions.

Referring back to FIG. 13, the tool generation system 1330 can provide different tools for different developers, different external companies, and/or different programming languages. Some examples of the tools 1300 can include the different WSDL files for APIs, remote SOAP proxy classes, request and response objects, configuration files and documentation. In a C++ language, the tools 1300 may exclude compiled class files because C++ compiled files are environment-specific. In a Microsoft .NET Framework, the tools 1300 may comprises a utility that is used to generate a Web service proxy for use in the .NET Framework development environment, and to create a client proxy in all.NET languages (e.g. C# and Visual BASIC.NET).

Figure 19:
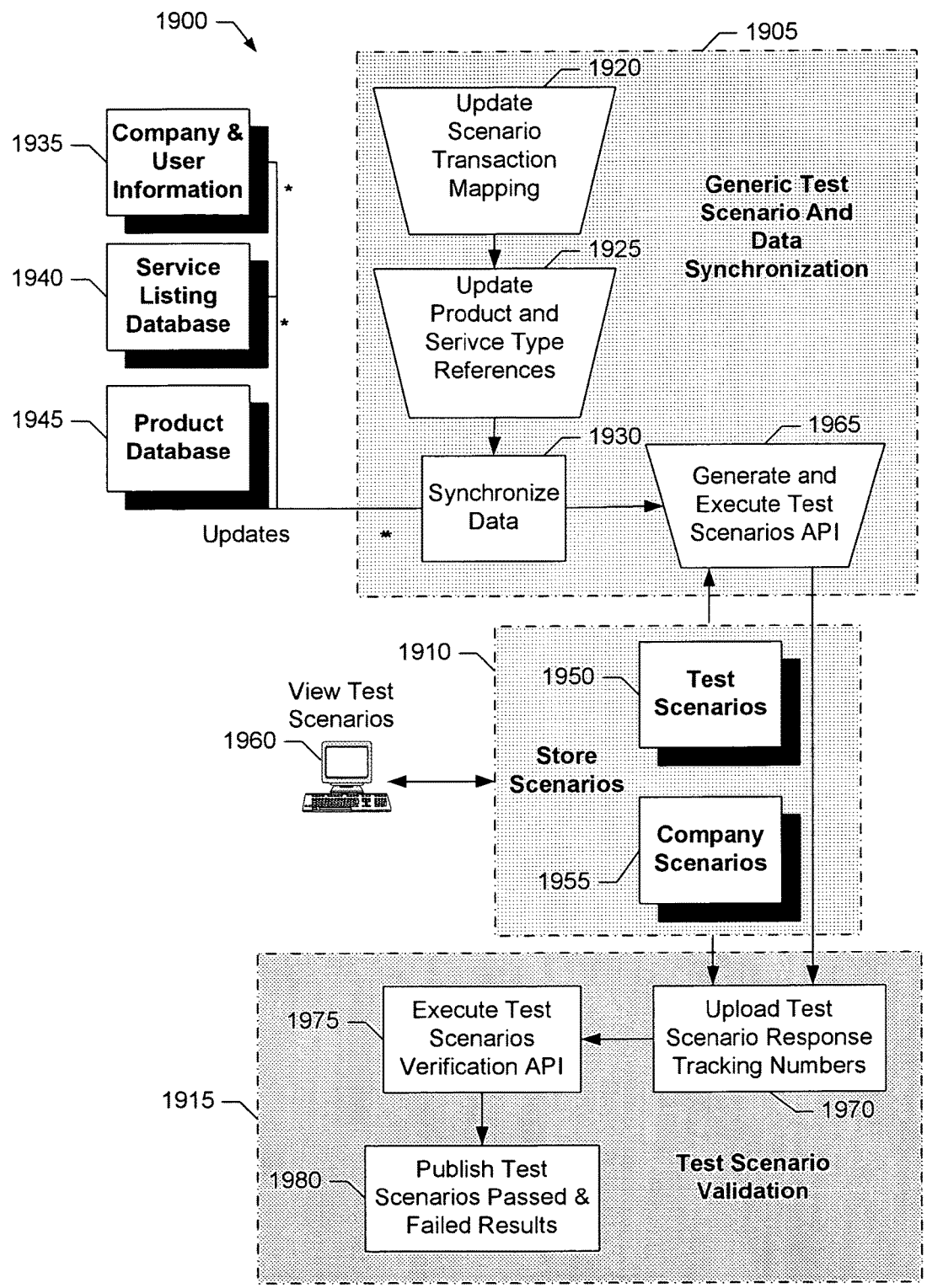
FIG. 19 is a block diagram of an example automated testing and scenario verification system that may be used to implement at least portions of the example channel implementation processor of FIG. 5 and/or the example channel development and verification process of FIG. 9.

An example automated testing and scenario verification system 1900 that may be used to implement at least portions of the example channel implementation processor 250 of FIG. 5 and/or blocks 940-970 of the example channel development and verification process 650 of FIG. 9 is shown in FIG. 19. The automated testing and scenario verification system 1900 streamlines and automates the execution of web services testing and verification under company-specific and/or generic scenarios. Example testing scenarios may include, but are not limited to, product(s) ordering, financial transaction processing, billing services transactions, data transfers, data validation, data storage, network connectivity, application form processing, etc.

The example automated testing and scenario verification system 1900 is implemented by an automated testing procedure 1905, a test scenario generation procedure 1910 and a scenario verification procedure 1915. The automated testing procedure 1905 may be implemented by machine readable instructions executing at the client company 110 on, for example, one or more of the client company computers 170-172. The test scenario generation procedure 1910 may be implemented by machine readable instructions executing at the client company 110 on, for example, one or more of the client company computers 170-172. Additionally or alternatively, the test scenario generation procedure 1910 may be implemented by machine readable instructions executing at the host company 120 on, for example, one or more of the host company computers 150-156. The scenario verification procedure 1915 may be implemented by machine readable instructions executing at the host company 120 on, for example, one or more of the host company computers 150-156.

The automated testing procedure 1905 begins execution at block 1920 at which information regarding product(s), financial services, billing services, etc. may be updated prior to being used as input for the creation and verification of the testing scenarios. Next, at block 1925, mapping information for scenario transactions may be updated to facilitate automated analysis and verification of the results of executed test scenarios. Then, at block 1930 the updated information from blocks 1920 and 1925 is synchronized with databases 1935-1945 at the client company 10 that contain company and user information, service listings and product listings, respectively.

Next, control proceeds to the test scenario generation procedure 1910 which executes blocks 1950 and/or 1955 to create generic and/or company-specific testing scenarios, respectively, as appropriate for the particular business relationship. For example, blocks 1950 and/or 1955 dynamically create generic and/or company-specific testing scenarios, respectively, based on the information included in the databases 1935-1945 at the client company 110, which may have been updated and synchronized by the automated testing procedure 1905. For example, blocks 1950 and/or 1955 may extract company and/or user specific information from the database 1935, such as user ID(s), user type(s), role type(s), company ID (name), target markets, permissions, etc. Additionally or alternatively, blocks 1950 and/or 1955 may extract service and/or product information from the databases 1940-1945, such as eligible services/products, eligible promotions, client selected services/products, client selected promotions, etc. Additionally or alternatively, blocks 1950 and/or 1955 may extract other information from other databases at the client company 110, such as technology specific information (e.g., such as system transactions available, system transactions eligible, transaction format, etc.), required test cases, business rules etc. The blocks 1950 and/or 1955 then load the company specific and/or generic testing scenarios into a temporary and/or permanent test scenario tables and/or databases. The test scenario generation procedure 1910 may also display the resulting test scenarios to a graphical user interface 1960 implemented by, for example, one or more of the client company computers 170-172.

Next, control proceeds to block 1965 of the automated testing procedure 1905 which retrieves the temporary and/or permanent test scenario tables and/or databases and executes the corresponding generic and/or company-specific testing scenarios created by blocks 1950 and 1955, respectively, of the test scenario generation procedure 1910. For example, at block 1965 the test scenarios may be executed sequentially based on predefined business rules, a ranking of the priority of test scenarios relative to each other, etc. Execution of the test scenarios at block 1965 may be performed manually and/or through execution of machine readable instructions implementing a tool that simulates manual execution performed by users, testers, developers, etc. The result from block 1965 is a set of test scenario responses corresponding to the set of executed test scenarios.

Next, control proceeds to the scenario verification procedure 1915 which begins execution at block 1970 at which a set of tracking numbers corresponding to the set of test scenario responses is uploaded from the automated testing procedure 1905. Control proceeds to block 1975 at which machine readable instructions implement a scenario verification tool to compare the test scenario responses output from block 1965 to a set of expected results indexed by the set of tracking numbers uploaded at block 1970. Control then proceeds to block 1980 at which test results are published in which test scenarios responses that match the expected results are given a passing mark and test scenario responses that do not match are given a failing mark. Failed test responses may also be accompanied by a detailed description of the errors resulting from the failed execution.

Figure 20:
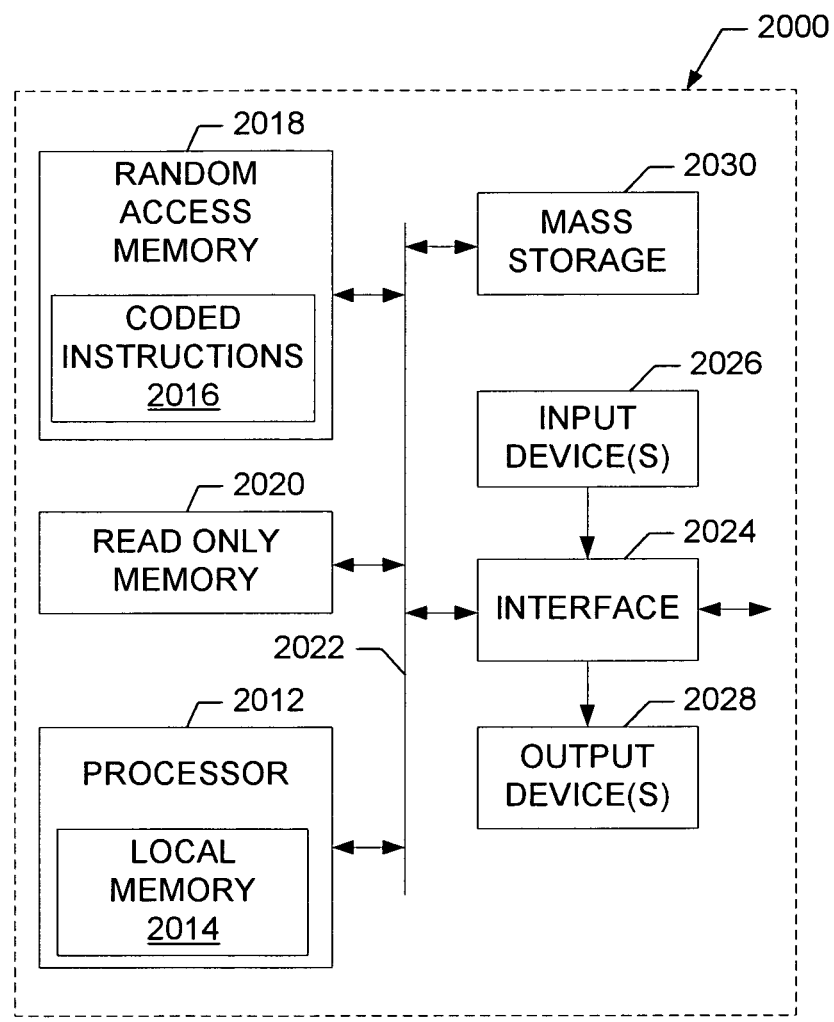
FIG. 20 is a block diagram of an example computer that may execute example machine readable instructions to implement at least portions of the example processes and/or procedures of FIGS. 6-9, 14-15 and/or 19.

FIG. 20 is a block diagram of an example computer 2000 capable of implementing the apparatus and methods disclosed herein. The computer 2000 can be, for example, a server, a personal computer, a personal digital assistant (PDA), an Internet appliance, a DVD player, a CD player, a digital video recorder, a personal video recorder, a set top box, or any other type of computing device.

The system 2000 of the instant example includes a processor 2012 such as a general purpose programmable processor. The processor 2012 includes a local memory 2014, and executes coded instructions 2016 present in the local memory 2014 and/or in another memory device. The processor 2012 may execute, among other things, machine readable instructions to implement the PRM application 140 and/or at least portions of the processes/procedures represented in FIGS. 6-9, 14 and/or 15. The processor 2012 may be any type of processing unit, such as one or more microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 2012 is in communication with a main memory including a volatile memory 2018 and a non-volatile memory 2020 via a bus 2022. The volatile memory 2018 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2020 may be implemented by flash memory and/or any other desired type of memory device. Access to the main memory 2018, 2020 is typically controlled by a memory controller (not shown) in a conventional manner.

The computer 2000 also includes a conventional interface circuit 2024. The interface circuit 2024 may be implemented by any type of well known interface standard, such as an Ethernet interface, a universal serial bus (USB), and/or a third generation input/output (3GIO) interface.

One or more input devices 2026 are connected to the interface circuit 2024. The input device(s) 2026 permit a user to enter data and commands into the processor 2012. The input device(s) can be implemented by, for example, a keyboard, a mouse, a touchscreen, a track-pad, a trackball, an isopoint and/or a voice recognition system.

One or more output devices 2028 are also connected to the interface circuit 2024. The output devices 2028 can be implemented, for example, by display devices (e.g., a liquid crystal display, a cathode ray tube display (CRT)), by a printer and/or by speakers. The interface circuit 2024, thus, typically includes a graphics driver card.

The interface circuit 2024 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 2000 also includes one or more mass storage devices 2030 for storing software and data. Examples of such mass storage devices 2030 include floppy disk drives, hard drive disks, compact disk drives and digital versatile disk (DVD) drives. The mass storage device 2030 and/or the volatile memory 2018 may be used, for example, to store the evaluation indicators generated by the host company business departments in the example partner acquisition process 610 of FIG. 7 and/or the example channel development and verification process 650 of FIG. 9.

At least some of the above described example systems and methods may be implemented by one or more software and/or firmware programs running on a computer processor. However, dedicated hardware implementations including, but not limited to, application specific integrated circuits, programmable logic arrays and other hardware devices can likewise be constructed to implement some or all of the example methods described herein, either in whole or in part. Furthermore, alternative software implementations including, but not limited to, distributed processing or component/object distributed processing, parallel processing, or virtual machine processing can also be constructed to implement the example methods described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

Additionally, although this patent discloses example systems and methods implemented at least in part by software or firmware executed on hardware, it should be noted that such implementations are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example systems, methods and articles of manufacture have been described herein, the scope of coverage of this patent is not limited thereto. On the contrary, this patent covers all systems, methods and articles of manufacture fairly falling within the scope of the appended claims either literally or under the doctrine of equivalents.

What is claimed is:

1. A method to activate a distribution channel, the method comprising:

obtaining first information concerning a client company that is to provide a distribution channel on behalf of a host company;

electronically triggering, using a processor, at least some of a plurality of host company departments to process the first information to evaluate at least one of the client company or the distribution channel;

electronically processing, using the processor, machine readable evaluation indicators provided by the at least some of the plurality of host company departments and representative of respective evaluation decisions associated with the at least some of the plurality of host company departments to determine an overall evaluation result; and after the overall evaluation result indicates approval of the distribution channel, electronically implementing, using the processor, the distribution channel by:

establishing, over a communication network, a secure communication interface between the host company and a web application implemented by the client company, the secure communication interface to carry second information describing characteristics, which are updateable in real-time, of host company services to be provided by the host company for distribution by the client company;

configuring the distribution channel using a profile associated with the client company, the profile to provide the client company with access to real-time pricing data specified by the host company for the host company services to be distributed by the client company, the real-time pricing data determined specifically for the client company by a partner relationship management application associated with the host company based on (1) a combination of profile information from the profile and (2) a priority specified for the client company by the host company, the combination of profile information being based on the first information and including service type information, service quota information, pricing discount information, and billing and compensation procedure information associated with the host company services to be distributed by the client company; and obtaining a screenshot of the web application that is based on at least some of the second information to validate operation of the distribution channel.

2. The method as defined in claim 1 wherein the first information comprises at least one of characteristics of services the client company proposes to at least one of sell or purchase, client company distribution locations, pricing information, billing information, a non-disclosure agreement, partnership contract terms or distribution channel test information.

3. The method as defined in claim 1 further comprising at least one of acquiring a potential distribution channel provider, configuring parameters of the distribution channel, developing functionality of the distribution channel or verifying functionality of the distribution channel.

4. The method as defined in claim 1 wherein the plurality of host company departments comprises at least one of a sales department, a marketing department, an accounting department, a human resources department, an information technology department or a distribution department.

5. The method as defined in claim 1 further comprising storing the first information in a central facility accessible by the plurality of host company departments.

6. The method as defined in claim 5 wherein storing the first information in a central facility comprises processing the first information with the partner relationship management application.

7. The method as defined in claim 1 wherein automatically triggering the at least some of the plurality of host company departments to process the first information comprises sending a message to the at least some of the plurality of host company departments over a second communication network.

8. The method as defined in claim 7 wherein the message comprises at least one of an email message, an instant message, an automatic phone call or a voicemail message.

9. The method as defined in claim 1 wherein automatically processing the machine readable evaluation indicators provided by the at least some of the plurality of host company departments comprises receiving the machine readable evaluation indicators over a second communication network.

10. The method as defined in claim 9 wherein the machine readable evaluation indicators comprise at least one of email messages, instant messages, automatic phone calls or voicemail messages.

11. The method as defined in claim 1 wherein automatically processing the machine readable evaluation indicators provided by the at least some of the plurality of host company departments comprises:
determining whether all required machine readable evaluation indicators have been received from the at least some of the plurality of host company departments; and
approving the distribution channel when each required machine readable evaluation indicator received from each respective host company department indicates approval of the at least one of the client company or the distribution channel.

12. The method as defined in claim 11 further comprising sending a message to the client company to at least one of: (1) indicate that the at least one of the client company or the distribution channel was approved, or (2) request additional information from the client company when the at least one of the client company or the distribution channel was not approved.

13. The method as defined in claim 1 further comprising sending a message to the client company indicating that distribution channel activation is complete.

14. The method as defined in claim 1 further comprising providing the client company with access to functionality associated with the partner relationship management application operating at the host company when the overall evaluation result indicates approval of the at least one of the client company or the distribution channel.

15. A partner relationship management system comprising:
a memory having machine readable instructions stored thereon; and
a processor to execute the instructions to perform operations comprising:
processing a first machine readable evaluation indicator provided by a first host company computer and a second machine readable evaluation indicator provided by a second host company computer to determine whether to activate a distribution channel that is to be provided by a client company on behalf of a host company, the first and second machine readable evaluation indicators being determined based on first information obtained from the client company; and
after the first and second machine readable evaluation indicators both indicate approval of the distribution channel, implementing the distribution channel by:
establishing, over a communication network, a secure communication interface between the host company and a web application at the client company, the secure communication interface to carry second information describing characteristics, which are updateable in real-time, of host company services to be provided by the host company for distribution by the client company;
configuring the distribution channel using a profile associated with the client company, the profile to provide the client company with access to real-time pricing data specified by the host company for host company services to be distributed by the client company, the real-time pricing data determined specifically for the client company by an application associated with the host company based on (1) a combination of profile information from the profile and (2) a priority specified for the client company by the host company, the combination of profile information being based on the first information and including service type information, service quota information, pricing discount information, and billing and compensation procedure information associated with the host company services to be distributed by the client company; and
obtaining a screenshot of the web application that is based on at least some of the second information to validate operation of the distribution channel.

16. The partner relationship management system as defined in claim 15 further comprising an interface to provide the client company with access to at least some features provided by the partner relationship management system.

17. The partner relationship management system as defined in claim 15 wherein the first information comprises at least one of characteristics of services the client company proposes to at least one of sell or purchase, client company distribution locations, pricing information, billing information, a non-disclosure agreement or partnership contract terms.

18. The partner relationship management system as defined in claim 15 wherein the first host company computer and the second host company computer are to approve the first information based on different criteria.

19. The partner relationship management system as defined in claim 15 wherein the operations further comprise sending at least one of an email message or an instant message to the at least some of the plurality of host company departments to trigger the first host company computer and the second host company computer.

20. The partner relationship management system as defined in claim 15 wherein the machine readable evaluation indicators comprise at least one of email messages or instant messages.

21. The partner relationship management system as defined in claim 15 wherein processing the first machine readable evaluation indicator and the second machine readable evaluation indicator comprises:
   determining whether the first machine readable evaluation indicator and the second machine readable evaluation indicator were received; and
   permitting activation of the distribution channel when the first machine readable evaluation indicator and the second machine readable evaluation indicator indicate that the first information was approved by the first host company computer and the second host company computer.

22. The partner relationship management system as defined in claim 15 wherein the operations further comprise providing the client company with access to functionality associated with the partner relationship management system after activation of the distribution channel.

23. A distribution channel activator comprising:
   a memory having machine readable instructions stored thereon; and
   a processor to execute the instructions to perform operations comprising;
      sending a trigger to a host company department to initiate processing of first information, obtained from a client company offering to provide a distribution channel for a host company, to determine whether to approve the distribution channel;
      monitoring for receipt of an indicator from the host company department, the indicator to indicate that processing of the first information is complete;
      providing a notification to the client company indicating whether the distribution channel has been approved; and
      after the distribution channel has been approved, (1) establishing, over a communication network, a secure communication interface between the host company and a web application implemented by the client company, the secure communication interface to carry second information describing characteristics, which are updateable in real-time, of host company services to be provided by the host company for distribution by the client company, (2) configuring the distribution channel using a profile associated with the client company, the profile to provide the client company with access to real-time pricing data specified by the host company for the host company services to be distributed by the client company, the real-time pricing data determined specifically for the client company by a partner relationship management application associated with the host company based on (a) a combination of profile information from the profile and (b) a priority specified for the client company by the host company, the combination of profile information being based on the first information and including service type information, service quota information, pricing discount information, and billing and compensation procedure information associated with the host company services to be distributed by the client company, and (3) obtaining a screenshot of the web application that is based on at least some of the second information to validate operation of the distribution channel.

24. The distribution channel activator as defined in claim 23 wherein the processor at least one of implements the partner relationship management application, or is communicatively coupled with the partner relationship management application.

25. The distribution channel activator as defined in claim 24 wherein the partner relationship management application is to be accessible by at least one of the host company department or the client company.

26. The distribution channel activator as defined in claim 23 wherein the operations further comprise storing the first information in a location accessible by the host company department.

27. The distribution channel activator as defined in claim 26 wherein the first information comprises machine readable information and the location comprises a database.

28. The distribution channel activator as defined in claim 23 wherein the operations further comprise providing access to data entered into at least one of an electronic application or an electronic non-disclosure agreement.

29. The distribution channel activator as defined in claim 23 wherein the operations further comprise prompting the client company to provide the first information.

30. The distribution channel activator as defined in claim 23 wherein the operations further comprise sending a second notification to the client company, after receipt of the indicator, to request additional information from the client company.

31. The distribution channel activator as defined in claim 30 wherein the message comprises at least one of an email message, an instant message, and automated phone call or a voicemail message.

32. A tangible machine readable storage medium device comprising machine readable instructions which, when executed, cause a machine to perform operations comprising:
   triggering at least some of a plurality of host company departments to evaluate first information corresponding to a potential distribution channel to be provided by a client company for a host company;
   processing machine readable evaluation indicators provided by the at least some of the plurality of host company departments and representative of respective evaluation decisions associated with the at least some of the plurality of host company departments to determine an overall evaluation result; and
   after the overall evaluation result indicates approval of the distribution channel, (1) establishing, over a communication network, a secure communication interface between the host company and a web application implemented by the client company, the secure communication interface to carry second information describing characteristics, which are updateable in real-time, of host company services to be provided by the host company for distribution by the client company, (2) configuring the distribution channel using a profile associated with the client company, the profile to provide the client company with access to real-time pricing data specified by the host company for the host company services to be distributed by the client company, the real-time pricing data determined specifically for the client company by a partner relationship management application based on (a) a combination of profile information from the profile and (b) a priority specified for the client company by the host company, the combination of profile information being based on the first information and including service type information, service quota information, pricing discount information, and billing and compensation procedure information associated with the host company services to be distributed by the client company, and (3) obtaining a screenshot of the web application that is based on at least some of the second information to validate operation of the distribution channel.

33. The storage device as defined in claim 32 wherein processing the machine readable evaluation indicators provided by the at least some of the plurality of host company departments comprises:
   determining whether all required machine readable evaluation indicators have been received from the at least some of the plurality of host company departments; and
   approving the first information corresponding to the potential distribution channel when each required machine readable evaluation indicator received from each respective host company department indicates approval of the first information.

34. The storage device as defined in claim 33 wherein the operations further comprise sending a second notification to the client company to request additional information from the client company when the first information corresponding to the potential distribution channel was not approved.

* * * * *